(12) United States Patent
Ichikawa

(10) Patent No.: US 9,255,364 B2
(45) Date of Patent: Feb. 9, 2016

(54) IMAGE GENERATING APPARATUS FOR PAVING MACHINE AND OPERATION SUPPORT SYSTEM FOR PAVING MACHINE

(71) Applicant: SUMITOMO HEAVY INDUSTRIES, LTD., Tokyo (JP)

(72) Inventor: Tomoko Ichikawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/670,524

(22) Filed: Mar. 27, 2015

(65) Prior Publication Data
US 2015/0197900 A1 Jul. 16, 2015

Related U.S. Application Data

(63) Continuation of application No. PCT/JP2013/076196, filed on Sep. 27, 2013.

(30) Foreign Application Priority Data

Nov. 8, 2012 (JP) ................................ 2012-246577
Apr. 26, 2013 (JP) ................................ 2013-094451

(51) Int. Cl.
| G06K 9/00 | (2006.01) |
| G06K 9/32 | (2006.01) |
| E01C 19/00 | (2006.01) |
| E01C 19/48 | (2006.01) |

(52) U.S. Cl.
CPC ............. *E01C 19/004* (2013.01); *E01C 19/48* (2013.01); *G06K 9/00791* (2013.01); *E01C 2301/00* (2013.01)

(58) Field of Classification Search
None
See application file for complete search history.

(56) References Cited

U.S. PATENT DOCUMENTS 6,222,447 B1 * 4/2001 Schofield ............... B60N 2/002
340/435
7,307,655 B1 * 12/2007 Okamoto ........... G06K 9/00791
348/222.1

(Continued)

FOREIGN PATENT DOCUMENTS

| JP | H04-077608 U | 7/1992 |
| JP | 2009-019353 | 1/2009 |

(Continued)

OTHER PUBLICATIONS

International Search Report mailed on Jan. 7, 2014.

*Primary Examiner* — Randolph I Chu
(74) *Attorney, Agent, or Firm* — Ipusa, PLLC

(57) ABSTRACT

An image generating apparatus for a paving machine, which generates an output image based on input images captured by multiple image capturing parts attached to the paving machine, includes a coordinates correlating part that correlates coordinates in a space model disposed around the paving machine with coordinates in input image planes in which the input images are positioned and an output image generating part that generates the output image by correlating the values of the coordinates in the input image planes with the values of coordinates in an output image plane in which the output image is positioned, via the coordinates in the space model. The space model includes a first plane area parallel to a road surface and a second plane area that intersects the road surface. The second plane area is set at the front end of the paving machine in a traveling direction of the paving machine.

14 Claims, 22 Drawing Sheets

(56) References Cited

U.S. PATENT DOCUMENTS

| | | | | |
|---|---|---|---|---|
| 2003/0085999 A1* | 5/2003 | Okamoto | B60R 1/00 | 348/148 |
| 2004/0105090 A1* | 6/2004 | Schultz | G01C 11/02 | 356/141.5 |
| 2004/0260469 A1* | 12/2004 | Mizusawa | B60R 1/00 | 701/300 |
| 2006/0022808 A1* | 2/2006 | Ito | G08G 1/167 | 340/425.5 |
| 2006/0187238 A1* | 8/2006 | Yoneji | B60R 1/00 | 345/629 |
| 2007/0041659 A1* | 2/2007 | Nobori | B60R 1/00 | 382/284 |
| 2007/0085901 A1* | 4/2007 | Yang | H04N 7/181 | 348/47 |
| 2008/0310680 A1* | 12/2008 | Azuma | G06K 9/00791 | 382/104 |
| 2009/0273674 A1* | 11/2009 | Russ | B60R 1/00 | 348/148 |
| 2010/0215433 A1* | 8/2010 | Fritz | E01C 19/006 | 404/84.5 |
| 2011/0098860 A1* | 4/2011 | Yoshiike | B62D 57/032 | 700/260 |
| 2011/0175752 A1* | 7/2011 | Augst | B60R 1/00 | 340/905 |
| 2011/0254833 A1* | 10/2011 | McDaniel | G06T 17/05 | 345/419 |
| 2012/0218411 A1* | 8/2012 | Wu | G01N 33/42 | 348/148 |
| 2013/0033493 A1 | 2/2013 | Kiyota | | |
| 2013/0034269 A1* | 2/2013 | Kiyota | E02F 9/26 | 382/103 |
| 2013/0051913 A1* | 2/2013 | Eul | E01C 19/006 | 404/84.5 |
| 2013/0182066 A1 | 7/2013 | Ishimoto | | |
| 2014/0104424 A1* | 4/2014 | Zhang | B60R 1/00 | 348/148 |

FOREIGN PATENT DOCUMENTS

| | | |
|---|---|---|
| JP | 2011-071919 | 4/2011 |
| WO | 2011/129274 | 10/2011 |
| WO | 2012/043522 | 4/2012 |

* cited by examiner

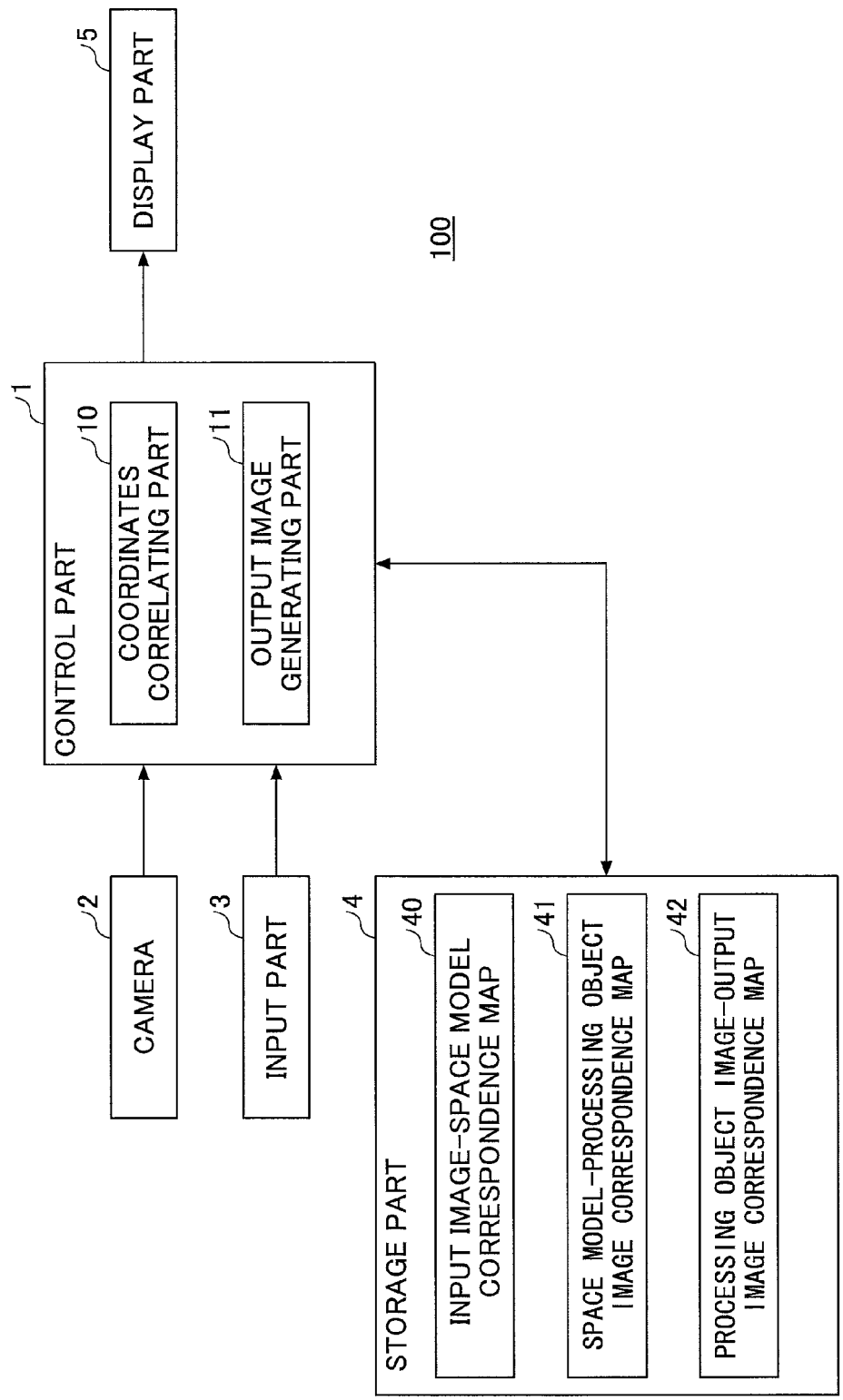

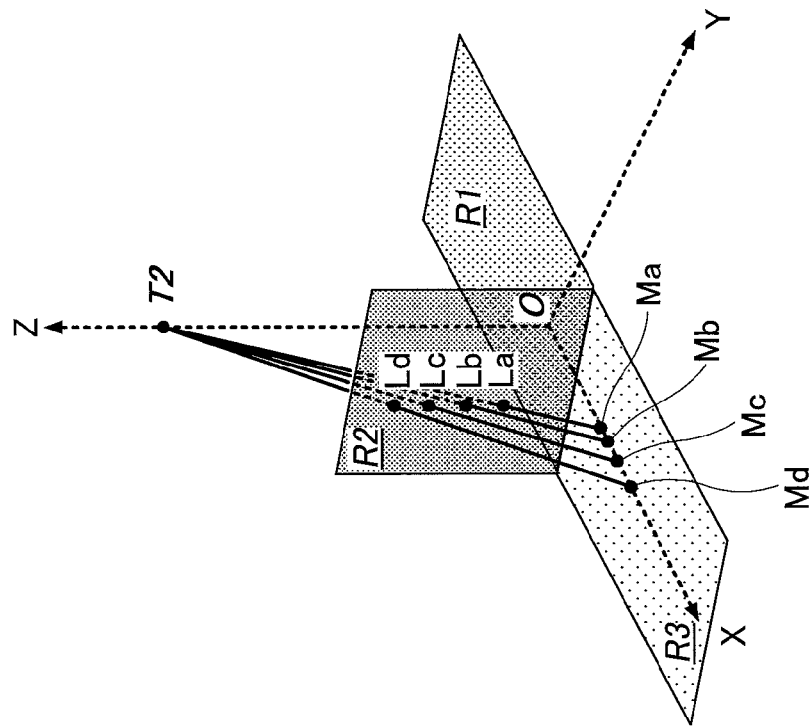
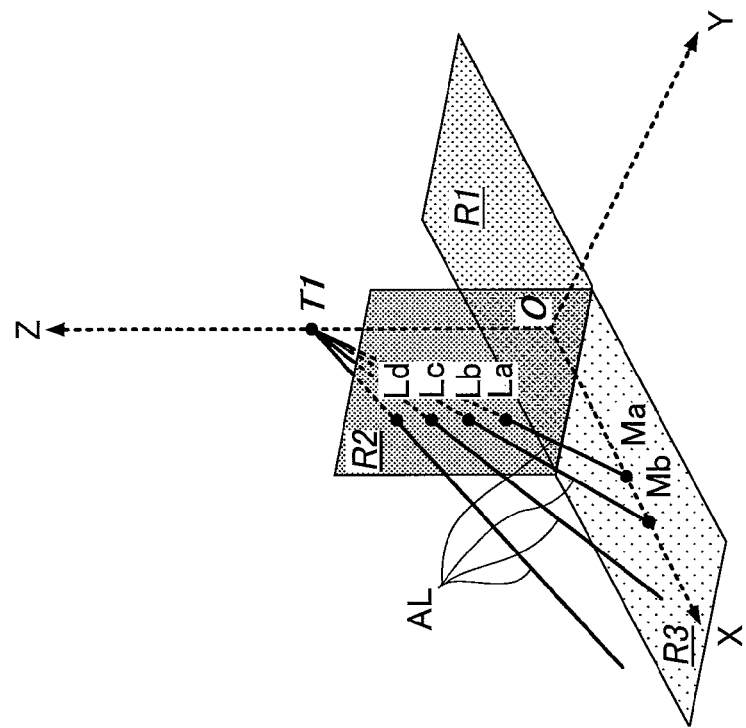
FIG.8B
FIG.8A

FIG.16
R11
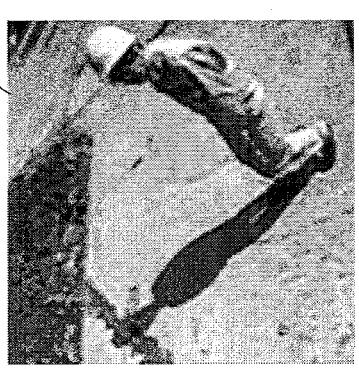
R10
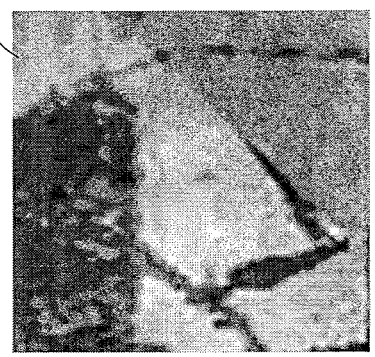
R12

 
FIG.18

FIG.21A
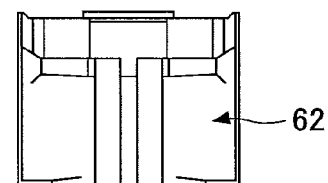
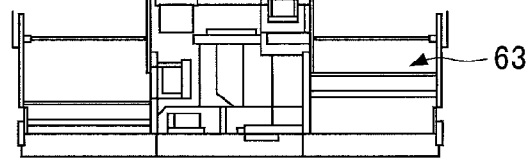
FIG.21B
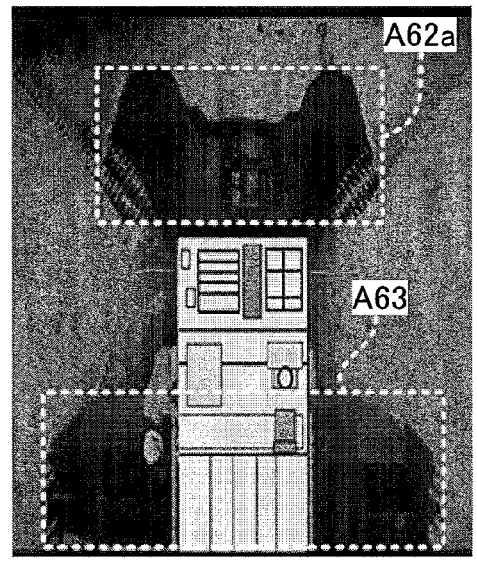
FIG.21C
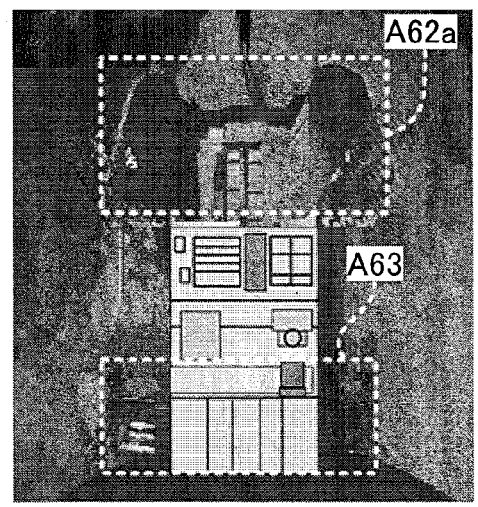

IMAGE GENERATING APPARATUS FOR PAVING MACHINE AND OPERATION SUPPORT SYSTEM FOR PAVING MACHINE

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2013/076196, filed on Sep. 27, 2013 and designating the U.S., which claims priority to Japanese Patent Application No. 2012-246577, filed on Nov. 8, 2012, and Japanese Patent Application No. 2013-094451, filed on Apr. 26, 2013. The entire contents of the foregoing applications are incorporated herein by reference.

BACKGROUND

1. Technical Field

The present invention relates to an image generating apparatus for a paving machine that generates an output image based on multiple input images captured with multiple cameras attached to the paving machine, and to an operation support system for a paving machine using the apparatus.

2. Description of Related Art

An operator support apparatus for an asphalt finisher that includes a camera that captures an image of the interior of a hopper, a camera that captures an image of a peripheral area of the hopper on its left outer side, and a camera that captures an image of a peripheral area of the hopper on its right outer side has been known.

SUMMARY

According to an aspect of the present invention, an image generating apparatus for a paving machine, which generates an output image based on input images captured by multiple image capturing parts attached to the paving machine, includes a coordinates correlating part that correlates coordinates in a space model disposed around the paving machine with coordinates in input image planes in which the input images are positioned and an output image generating part that generates the output image by correlating the values of the coordinates in the input image planes with the values of coordinates in an output image plane in which the output image is positioned, via the coordinates in the space model. The space model includes a first plane area parallel to a road surface and a second plane area that intersects the road surface. The second plane area is set at the front end of the paving machine in a traveling direction of the paving machine.

According to an aspect of the present invention, an operation support system that supports a movement or an operation of a paving machine includes the image generating apparatus for a paving machine as set forth above and a display part that is provided around an operation part for moving or operating the paving machine and that displays the output image generated by the image generating apparatus for a paving machine.

It is to be understood that both the foregoing general description and the following detailed description are exemplary and explanatory and not restrictive of the invention.

BRIEF DESCRIPTION OF THE DRAWINGS

FIG. 1 is a block diagram schematically illustrating a configuration of an image generating apparatus according to an embodiment of the present invention;

FIGS. 8A and 8B are diagrams for illustrating effects of a group of auxiliary lines;

FIG. 16 illustrates yet another display example of the output image;

FIG. 18 illustrates a difference between the output image illustrated in FIG. 16 and an output image in the case of applying the lattice pattern to the output image of FIG. 16 in a contrasting manner;

FIGS. 21A, 21B and 21C illustrate yet other display examples of the output image.

DETAILED DESCRIPTION

Figure 2A:
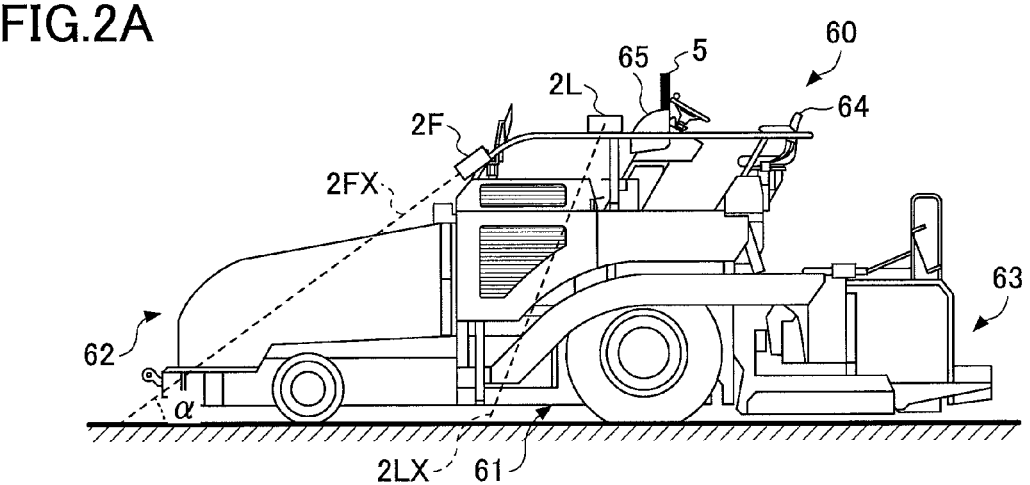
FIGS. 2A, 2B and 2C are diagrams illustrating a configuration of an asphalt finisher on which the image generating apparatus of FIG. 1 is mounted.

The asphalt finisher according to related art includes a monitor that displays images captured with the cameras, where the monitor is positioned so as to be viewable from an operator seat movable in the directions of the vehicle width. The operator support apparatus automatically switches images displayed on the monitor in accordance with the position of the operator seat in the directions of the vehicle width. As a result, the operator support apparatus enables the operator to easily view a blind area that changes in accordance with the position of the operator seat.

The operator support apparatus according to Patent Document 1, however, only makes it possible for the operator to view a blind area around the hopper, and does not enable the operator to view other blind areas around the asphalt finisher.

Therefore, the operator support apparatus according to Patent Document 1 is insufficient to support the operation of the asphalt finisher.

According to an aspect of the present invention, an image generating apparatus for a paving machine and an operation support system for a paving machine that show surrounding blind areas in an easier-to-understand manner are provided.

A description is given below, with reference to the drawings, of one or more embodiments of the present invention.

FIG. 1 is a block diagram schematically illustrating a configuration of an image generating apparatus according to an embodiment of the present invention.

An image generating apparatus 100 is, for example, an apparatus that generates an output image based on input images captured with cameras 2 provided on a paving machine and presents the output image to an operator. According to this embodiment, the image generating apparatus 100 is provided on an asphalt finisher 60 serving as a paving machine, and includes a control part 1, the cameras 2, an input part 3, a storage part 4, and a display part 5.

Figure 2B:
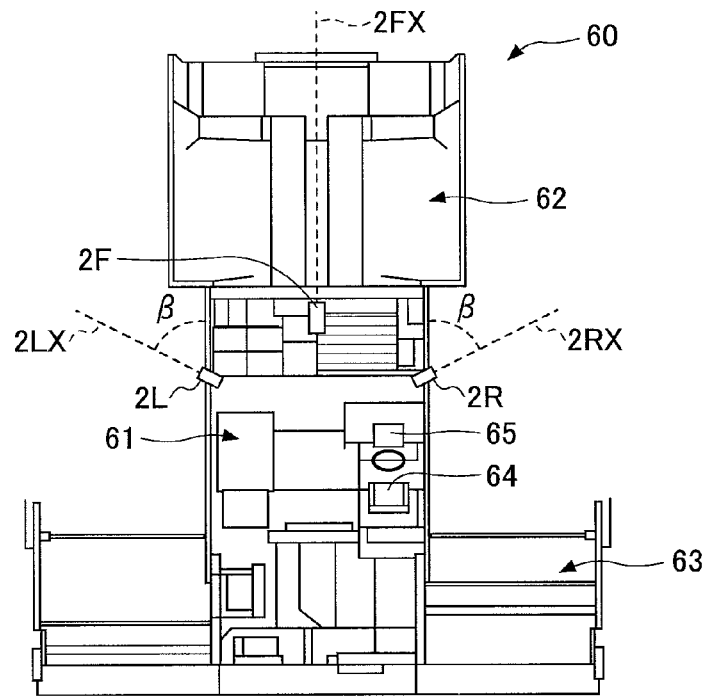
Figure 2C:
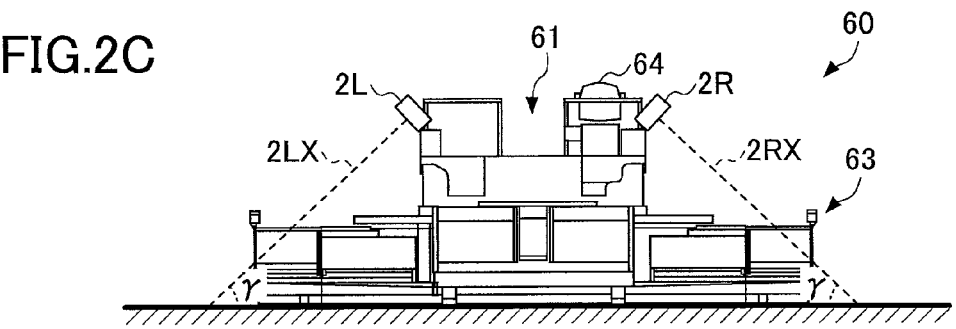

FIGS. 2A, 2B and 2C are diagrams illustrating a configuration of the asphalt finisher 60 on which the image generating apparatus 100 is mounted. FIG. 2A shows a left side view, FIG. 2B shows a plan view, and FIG. 2C shows a rear view.

The asphalt finisher 60 is composed mainly of a tractor part 61, a hopper part 62, and a screed part 63.

The tractor part 61 is a mechanism for causing the asphalt finisher 60 to travel. According to this embodiment, the tractor part 61 causes the asphalt finisher 60 to move by rotating four wheels using traveling hydraulic motors. The traveling hydraulic motors (not graphically represented) rotate by receiving hydraulic oil supplied from hydraulic pumps (not graphically represented) driven by a motor (not graphically represented) such as a diesel engine. Furthermore, a cab including an operator seat 64 and an operation part 65 is disposed on top of the tractor part 61.

Furthermore, the cameras 2 (a right-side-part camera 2R, a left-side-part camera 2L, and a front camera 2F) are attached to a right side part, a left side part, and the front of the tractor part 61. The display part 5 is provided at a position easily viewable by the operator in the cab. According to this embodiment, the direction of the hopper part 62 as viewed from the tractor part 61 is determined as frontward, and the direction of the screed part 63 as viewed from the tractor part 61 is determined as rearward.

The hopper part 62 is a mechanism for receiving an asphalt mixture. According to this embodiment, the hopper part 62 is configured to be openable and closable in the directions of the vehicle width by a hydraulic cylinder (not graphically represented). Normally, the asphalt finisher 60 receives an asphalt mixture from the bed of a dump truck (not graphically represented) with the hopper part 62 fully open. FIGS. 2A through 2C illustrate that the hopper part 62 is fully open. When the asphalt mixture in the hopper part 62 decreases, the hopper part 62 is closed so as to allow the asphalt mixture near the inner wall of the hopper part 62 to be gathered to a center and fed to the screed part 63.

The screed part 63 is a mechanism for laying and leveling an asphalt mixture. According to this embodiment, the screed part 63 is configured to be able to rise and lower vertically and to extend and contract in the directions of the vehicle width with a hydraulic cylinder (not graphically represented). Specifically, when the screed part 63 is extended in the directions of the vehicle width, the width of the screed part 63 is greater than the width of the tractor part 61.

Next, a description is given of individual components of the image generating apparatus 100.

The control part 1 is a computer that includes a CPU (Central Processing Unit), a RAM (Random Access Memory), a ROM (Read Only Memory), and an NVRAM (Non-Volatile Random Access Memory). For example, the control part 1 stores programs corresponding to a below-described coordinates correlating part 10 and an output image generating part 11, respectively, in the ROM or the NVRAM, and causes the CPU to execute processes corresponding to the respective parts 10 and 11 using the RAM as a temporary storage area.

The cameras 2 are devices for capturing input images that represent the surroundings of the asphalt finisher 60. For example, the cameras 2 are attached to the tractor part 61 so as to be able to capture the images of blind areas for the operator in the cab.

The blind areas include, for example, the interior space (in particular, a part close to the tractor part 61) of the hopper part 62, spaces outside the right and left corners of the front end of the hopper part 62 in a closed state, and spaces close to a road surface near the right and left side parts of the asphalt finisher 60 (in particular, a space across the central axis of the vehicle body from the cab in the directions of the vehicle width, for example, a space close to a road surface near the left side part of the asphalt finisher 60 in the case where the cab is on the right side of the central axis of the vehicle body in the directions of the vehicle width as in this embodiment).

Furthermore, the cameras 2 may also be attached to positions other than the right side part, the left side part, and the front (for example, the rear) of the tractor part 61. A wide-angle lens or a fisheye lens may be attached to the cameras 2. Furthermore, the cameras 2 may also be attached to the hopper part 62 or to the screed part 63.

According to this embodiment, the cameras 2 include the front camera 2F, the left-side-part camera 2L, and the right-side-part camera 2R. As illustrated in FIG. 2A and FIG. 2B, the front camera 2F is attached to an upper end of the front of the tractor part 61, and is attached so that its optical axis 2FX extends forward relative to the traveling direction and forms an angle α (for example, 65 degrees) with respect to a road surface when viewed from a side. Furthermore, as illustrated in FIGS. 2A through 2C, the left-side-part camera 2L is attached to an upper end of the left side part of the tractor part 61, and is attached so that its optical axis 2LX forms an angle β (for example, 70 degrees) with respect to a left side surface of the tractor part 61 when viewed from above and forms an angle γ with respect to the road surface when viewed from the rear. The right-side camera 2R is attached in the same manner as the left-side camera 2L with right and left reversed.

Furthermore, the cameras 2 may be attached to attachment stays extending from the tractor part 61, directly attached to the tractor part 61 without using attachment stays, or buried in the tractor part 61.

Furthermore, the cameras 2 obtain input images in accordance with control signals from the control part 1 and output the obtained input images to the control part 1. In the case of obtaining input images using a fisheye lens or a wide-angle lens, the cameras 2 may output corrected input images in which an apparent distortion and tilt and shift caused by using these lenses are corrected to the control part 1. Alternatively, the cameras 2 may directly output input images whose apparent distortion or tilt and shift is not corrected to the control part 1. In the case of direct outputting, the control part 1 corrects the apparent distortion and tilt and shift.

Thus, the cameras 2 obtain input images so that their imaging range includes continuous areas including multiple blind areas on the right side and the left side of the asphalt finisher 60 and inside and around the hopper part 62.

The input part 3 is a device for enabling a user including an operator to input various kinds of information to the image generating apparatus 100, and is, for example, a touchscreen panel, button switches or the like.

The storage part 4 is a device for storing various kinds of information, and is, for example, a hard disk, an optical disk, a semiconductor memory or the like.

The display part 5 is a device for displaying image information. The display part 5 is, for example, a liquid crystal display provided in the cab, and displays various kinds of images that the control part 1 outputs.

Furthermore, the image generating apparatus 100 may generate processing object images based on input images, generate an output image that enables an intuitive understanding of a positional relationship with and distances from surrounding obstacles by performing image conversion on the processing object images, and thereafter present the output image to the user.

The "processing object images" are images to be subjected to image conversion processes (for example, a scale transformation, an affine transformation, a distortion transformation, a viewpoint transformation, etc.), which are generated based on input images. The image generating apparatus 100 may use in an image conversion process, for example, an input image that is captured by a camera that captures an image of a ground surface from above and includes an image in a horizontal direction (for example, a sky part) because of its wide angle of view. In this case, the image generating apparatus 100 projects the input image onto a predetermined space model so as to prevent the image in the horizontal direction from being unnaturally displayed (for example, so as to prevent the sky part from being treated as being on the ground surface). Thereafter, the image generating apparatus 100 obtains a processing object image suitable for image conversion by re-projecting the projected image projected onto the space model onto a different two-dimensional plane. Alternatively, the processing object image may be directly used as an output image without being subjected to image conversion.

The "space model" is a target onto which an input image is projected, and is composed of one or more flat surfaces or curved surfaces that include at least a flat surface or curved surface other than a processing object image plane that is a plane in which a processing object image is positioned (for example, a flat surface parallel to the processing object image plane or a flat surface or curved surface that forms an angle with the processing object image plane).

The image generating apparatus 100 may generate an output image by performing image conversion on the projected image projected onto the space model without generating a processing object image. Alternatively, the projected image may be directly used as an output image without being subjected to image conversion.

Figure 3A:
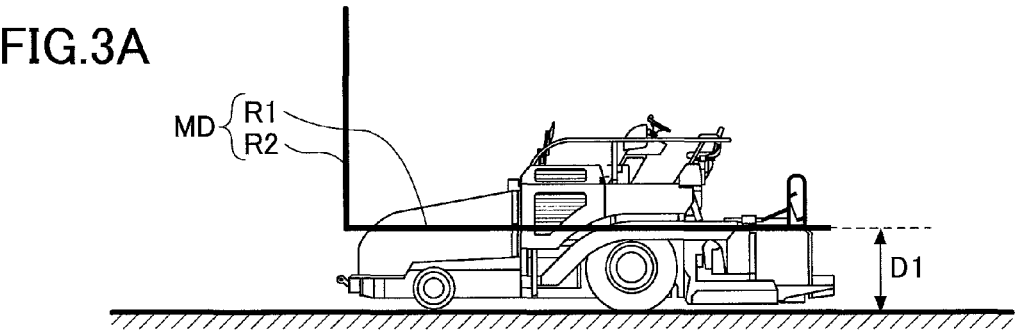
FIGS. 3A, 3B and 3C are diagrams illustrating a space model onto which an input image is projected.
Figure 3B:
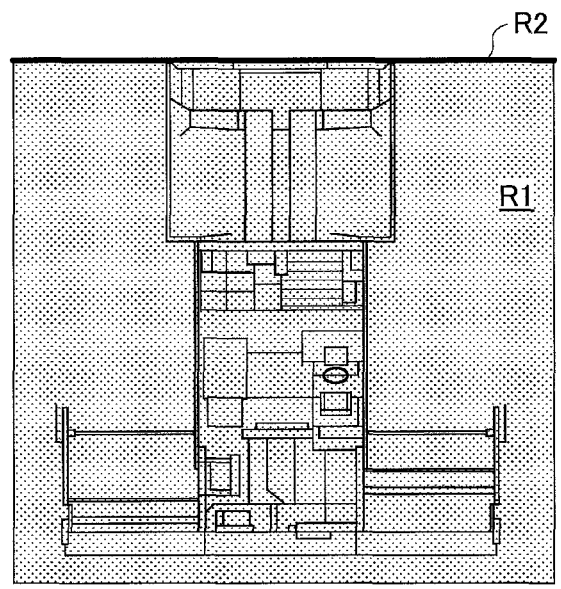
Figure 3C:
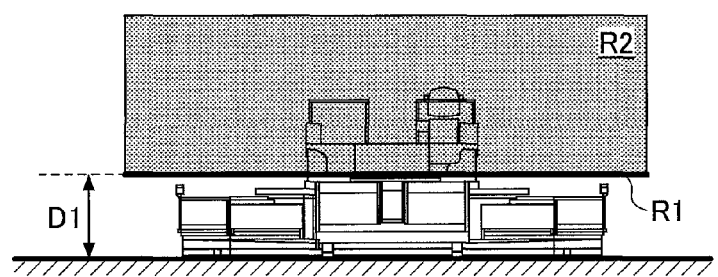

FIGS. 3A, 3B and 3C are diagrams illustrating a space model MD onto which an input image is projected. FIG. 3A illustrates the relationship between the asphalt finisher 60 and the space model MD when the asphalt finisher 60 is viewed from the left side. FIG. 3B illustrates the relationship between the asphalt finisher 60 and the space model MD when the asphalt finisher 60 is viewed from above. FIG. 3C illustrates the relationship between the asphalt finisher 60 and the space model MD when the asphalt finisher 60 is viewed from the rear.

As illustrated in FIGS. 3A through 3C, the space model MD includes a first plane area R1 that is parallel to a road surface and a second plane area R2 that intersects the road surface.

The first plane area R1 is an input image projection target mainly used to generate a road surface image (an overhead image of the imaging range) by a viewpoint transformation. According to this embodiment, as illustrated in FIG. 3A and FIG. 3C, the first plane area R1 is set at a height of a distance D1 (for example, 1200 mm) from the road surface. This is for preventing, in generating a road surface image from an input image including an image of the hopper part 62 (hereinafter, "hopper part image"), the hopper part image from being displayed excessively large to give a feeling of strangeness to the user who views the road surface image. Specifically, in the road surface image generated by a viewpoint transformation, an object at a position higher than the height of the first plane area R1 in the actual three-dimensional space tends to be displayed large, and an object at a position lower than the height of the first plane area R1 in the actual three-dimensional space tends to be displayed small. Therefore, in the road surface image generated by a viewpoint transformation, when the first plane area R1 is level with the road surface, an image of the hopper part 62 at a predetermined height from the road surface (hereinafter, "hopper part height") is displayed larger than necessary. On the other hand, when the first plane area R1 is at the same height as the hopper part height, the hopper part image can be displayed without being rendered larger than is required in the road surface image generated by a viewpoint transformation. In this case, an object positioned lower than the hopper part height is displayed small, but the user who views the road surface image does not have a feeling of strangeness. Therefore, the first plane area R1 is set at, for example, the hopper part height. It is possible, however, to set the first plane area R1 at the same height as the road surface.

The second plane area R2 is an input image projection target mainly used to generate a distant view image (an image at the time of looking in the traveling direction of the asphalt finisher 60 from the front camera 2F side) by a viewpoint transformation. Furthermore, the second plane area R2 is disposed at the front end of the asphalt finisher 60 in the traveling direction. According to this embodiment, the second plane area R2 is set at the front end of the hopper part 62. Furthermore, the second plane area R2 is set to be perpendicular to the road surface and perpendicular to the traveling direction of the asphalt finisher 60. This is for causing an image of the hopper part 62 to be projected onto the first plane area R1. Specifically, this is for enabling the user to view an overhead image of the interior of the hopper part 62 and a lateral (rear) view image of the front of the hopper part 62 outside the hopper part 62.

Figure 4:
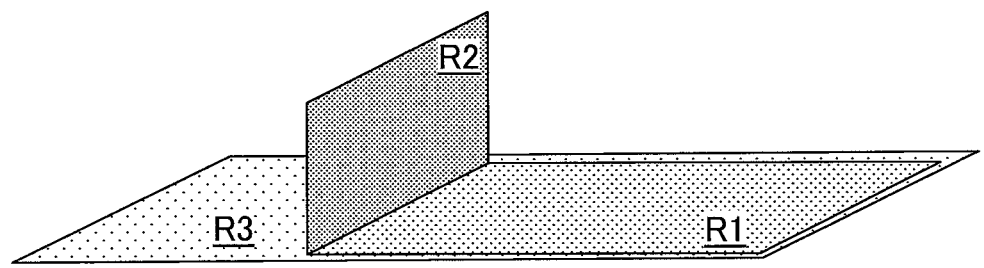
FIG. 4 is a diagram illustrating a relationship between the space model and a processing object image plane.

FIG. 4 is a diagram illustrating a relationship between the space model MD and the processing object image plane. A processing object image plane R3 is, for example, a plane that includes the first plane area R1 of the space model MD.

Next, a description is given of various parts possessed by the control part 1.

The coordinates correlating part 10 is a part that correlates coordinates in input image planes in which input images captured by the cameras 2 are positioned, coordinates in the space model MD, and coordinates in the processing object image plane R3. The coordinates correlating part 10, for example, correlates coordinates in input image planes, coordinates in the space model MD, and coordinates in the processing object image plane R3 based on various kinds of parameters related to the cameras 2 that are preset or input via the input part 3 and a preset mutual positional relation of input image planes, the space model MD and the processing object image plane R3. The various kinds of parameters related to the cameras 2 includes the optical center, focal length, CCD size, optical axis direction vector, camera horizontal direction vector, projection system, etc., of the cameras 2. The coordinates correlating part 10 stores the correlations in an input image-space model correspondence map 40 and a space model-processing object image correspondence map 41 of the storage part 4.

In the case of generating no processing object image, the coordinates correlating part 10 omits correlating coordinates in the space model MD and coordinates in the processing object image plane R3 and storing the correlation in the space model-processing object image correspondence map 41.

The output image generating part 11 is a part that generates an output image. The output image generating part 11, for example, correlates coordinates in the processing object image plane R3 and coordinates in an output image plane in which the output image is positioned by performing a scale transformation, an affine transformation, or a distortion transformation on a processing object image. Then, the output image generating part 11 stores the correlation in a processing object image-output image correspondence map 42 of the storage part 4. Then, the output image generating part 11 generates the output image, associating the values (for example, the luminance value, hue value, saturation value, etc.) of each pixel of the output image with the values of each pixel of the input image while referring to the input image-space model correspondence map 40 and the space model-processing object image correspondence map 41 whose values have been stored by the coordinates correlating part 10.

Furthermore, the output image generating part 11 correlates coordinates in the processing object image plane R3 and coordinates in the output image plane in which the output image is positioned based on various kinds of parameters related to a virtual camera that are preset or input via the input part 3. The various kinds of parameters related to a virtual camera include the optical center, focal length, CCD size, optical axial direction vector, camera horizontal direction vector, projection system, etc., of the virtual camera. Then, the output image generating part 11 stores the correlation in the processing object image-output image correspondence map 42 of the storage part 4. Then, the output image generating part 11 generates the output image, associating the values (for example, the luminance value, hue value, saturation value, etc.) of each pixel of the output image with the values of each pixel of the input image while referring to the input image-space model correspondence map 40 and the space model-processing object image correspondence map 41 whose values have been stored by the coordinates correlating part 10.

The output image generating part 11 may alternatively generate the output image by changing the scale of the processing object image without using the concept of the virtual camera.

In the case of generating no processing object image, the output image generating part 11 correlates coordinates in the space model MD and coordinates in the output image plane in accordance with image conversion that has been performed. Then, the output image generating part 11 generates the output image, associating the values (for example, the luminance value, hue value, saturation value, etc.) of each pixel of the output image with the values of each pixel of the input image while referring to the input image-space model correspondence map 40. In this case, the output image generating part 11 omits correlating coordinates in the processing object image plane R3 and coordinates in the output image plane and storing the correlation in the processing object image-output image correspondence map 42.

Next, a description is given of a specific process executed by the coordinates correlating part 10 and the output image generating part 11.

The coordinates correlating part 10 may correlate coordinates in the input image plane and coordinates in the space model using, for example, Hamiltonian quaternions.

Figure 5:
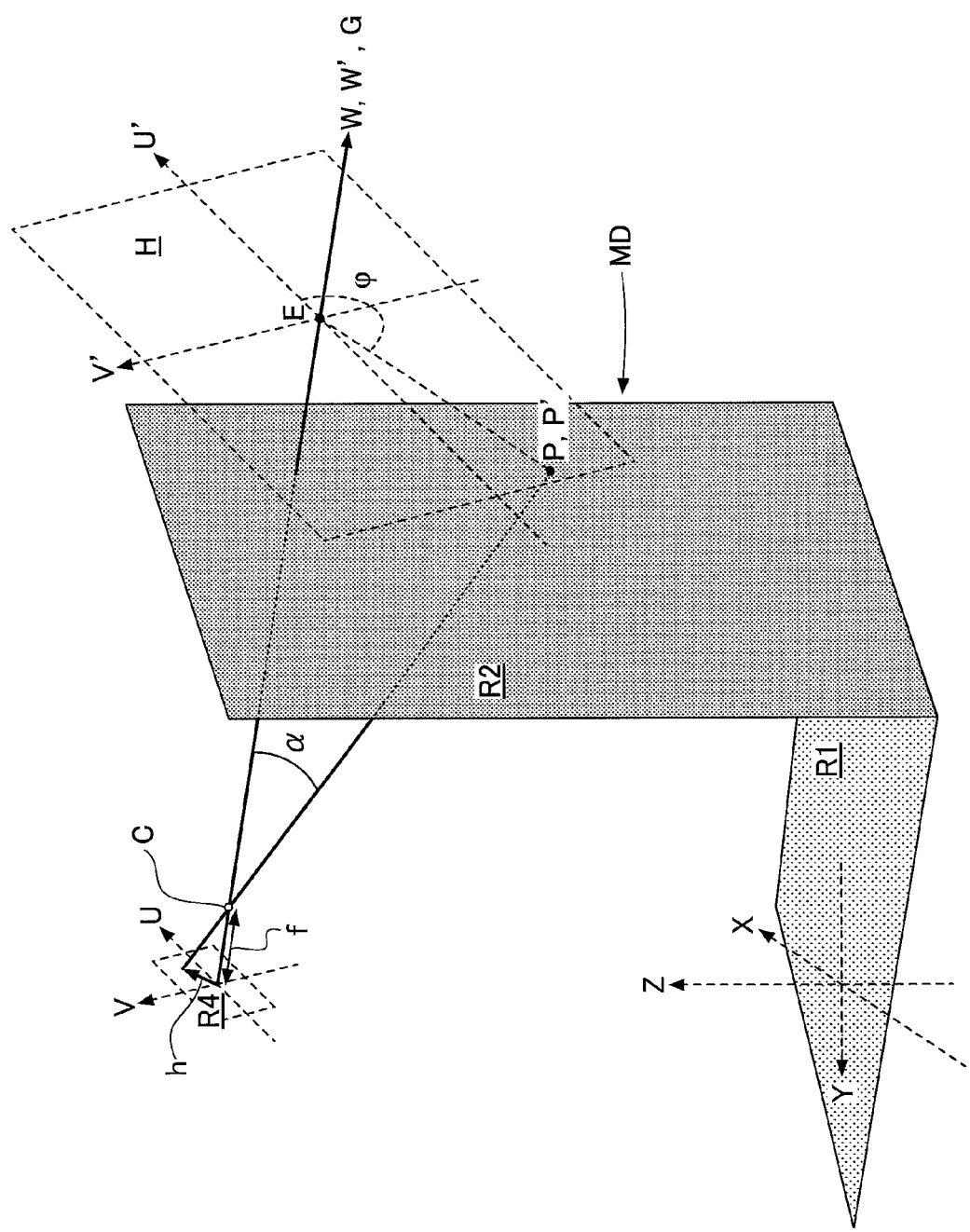
FIG. 5 is a diagram for illustrating the correlation between coordinates in an input image plane and coordinates in the space model.

FIG. 5 is a diagram for illustrating the correlation between coordinates in the input image plane and coordinates in the space model. In FIG. 5, the input image plane of the camera 2 is represented as a single plane in a UVW Cartesian coordinate system with the origin at the optical center C of the camera 2, and the space model is represented as cubic planes in an XYZ Cartesian coordinate system.

First, the coordinates correlating part 10 transforms coordinates in the space model (coordinates in the XYZ coordinate system) into coordinates in the input image plane (coordinates in the UVW coordinate system). Therefore, the coordinates correlating part 10 rotates the XYZ coordinate system so that the X-axis, Y-axis and Z-axis coincide with the U-axis, V-axis and −W-axis (the sign "−" indicates that the direction is reverse. This is because a frontward direction from the camera is a +W direction in the UVW coordinate system and a vertically downward direction is a −Z direction in the XYZ coordinate system), respectively, after translating the original of the XYZ coordinate system to the optical center C (the original of the UVW coordinate system).

When there are multiple cameras 2, the cameras 2 have respective individual UVW coordinate systems. Therefore, the coordinates correlating part 10 translates and rotates the XYZ coordinate system with respect to each of the UVW coordinate systems.

The above-noted transformation is achieved by rotating the XYZ coordinate system so that the Z-axis coincides with the −W-axis and further rotating the XYZ coordinate system so that the X-axis coincides with the U-axis, after translating the XYZ coordinate system so that the optical center C of the camera 2 becomes the origin of the XYZ coordinate system. Therefore, it is possible for the coordinates correlating part 10 to integrate the two rotations into a single rotation operation by describing this transformation with Hamiltonian quaternions.

Incidentally, a rotation for causing a vector A to coincide with another vector B corresponds to the process of rotating the vector A for the angle defined by the vector A and the vector B around a normal line of the plane defined by the vector A and the vector B. Letting the angle be θ, from the inner product of the vector A and the vector B, the angle θ is expressed by:

$$\theta = \cos^{-1}\left(\frac{A \cdot B}{|A||B|}\right).$$

Furthermore, from the outer product of the vector A and the vector B, the unit vector N of the normal line of the plane defined by the vector A and the vector B is expressed by:

$$N = \frac{A \times B}{|A||B|\sin\theta}.$$

Furthermore, a quaternion is a hypercomplex number that satisfies:

$$ii = jj = kk = ijk = -1,$$

where i, j and k are unit imaginary numbers, respectively. According to this embodiment, a quaternion Q is expressed by:

$$Q=(t;a,b,c)=t+ai+bj+ck,$$

where t is a real part and a, b and c are purely imaginary parts, and the conjugate quaternion of the quaternion Q is expressed by:

$$Q^*=(t;-a,-b,-c)=t-ai-bj-ck.$$

The quaternion Q can express a three-dimensional vector (a, b, c) by the purely imaginary parts a, b and c with the real part t being 0 (zero), and can also express a rotational operation around any vector by the parts t, a, b and c.

Furthermore, the quaternion Q can integrate and express a series of rotational operations as a single rotational operation. The quaternion Q can, for example, express a point D (ex, ey, ez) to which an arbitrary point S (sx, sy, sz) is rotated for an angle θ around any unit vector C (l, m, n) as follows:

$$D = (0; ex, ey, ez) = QSQ^*,$$

where $$S = (0; sx, sy, sz)$$

and $$Q = \left(\cos\frac{\theta}{2}; l\sin\frac{\theta}{2}, m\sin\frac{\theta}{2}, n\sin\frac{\theta}{2}\right).$$

Here, according to this embodiment, letting a quaternion that expresses a rotation that causes the Z-axis to coincide with the −W-axis be Qz, because a point X on the X-axis in the XYZ coordinate system is moved to a point X', the point X' is expressed by:

$$X'=Q_zXQ_z^*.$$

Furthermore, according to this embodiment, letting a quaternion that expresses a rotation that causes a line connecting the point X' on the X-axis and the origin to coincide with the U-axis be Qx, a quaternion R that expresses "a rotation that causes the Z-axis to coincide with the −W-axis and further causes the X-axis to coincide with the U-axis" is expressed by:

$$R=Q_xQ_z.$$

Thus, coordinates P' that are arbitrary coordinates P in the space model (the XYZ coordinate system) expressed by coordinates in the input image plane (the UVW coordinate system) are expressed by:

$$P'=RPR^*.$$

Furthermore, the quaternion R is invariable for each camera 2. Therefore, it is possible for the coordinates correlating part 10 to transform coordinates in the space model (the XYZ coordinate system) into coordinates in the input image plane (UVW coordinate system) by simply performing this operation.

After transforming coordinates in the space model (the XYZ coordinate system) into coordinates in the input image plane (UVW coordinate system), the coordinates correlating part 10 calculates an angle of incidence α defined by a line segment CP' and an optical axis G of the camera 2. The line segment CP' is a line segment that connects the optical center C (coordinates in the UVW coordinate system) of the camera 2 and the coordinates P', which are the arbitrary coordinates P in the space model expressed in the UVW coordinate system.

Furthermore, the coordinates correlating part 10 calculates an argument φ defined by a line segment EP' that connects an intersection E of a plane H and the optical axis G and the coordinates P' and a U'-axis in the plane H, and the length of the line segment EP'. The plane H is a plane that is parallel to an input image plane R4 (for example, a CCD surface) of the camera 2 and includes the coordinates P'.

In the optical system of a camera, normally, an image height h is a function of an angle of incidence α and a focal length f. Therefore, the coordinates correlating part 10 calculates the image height h by selecting an appropriate projection system such as normal projection (h=f tan α), orthogonal projection (h=f sin α), stereographic projection (h=2f tan(α/2)), equisolid angle projection (h=2f sin(α/2)) or equidistant projection (h=fα).

Thereafter, the coordinates correlating part 10 decomposes the calculated image height h into a U-component and a V-component in a UV coordinate system according to the argument φ, and divides them by a numerical value corresponding to the pixel size per pixel of the input image plane R4. As a result, it is possible for the coordinates correlating part 10 to correlate the coordinates P (P') in the space model MD and coordinates on the input image plane R4.

It is assumed that the pixel size per pixel of the input image plane R4 in the U-axis direction is au and the pixel size per pixel of the input image plane R4 in the V-axis direction is av. In this case, coordinates (u, v) in the input image plane R4 corresponding to the coordinates P (P') in the space model MD are expressed by:

$$u = \frac{h\cos\varphi}{a_u}$$

and $$v = \frac{h\sin\varphi}{a_v}.$$

Thus, the coordinates correlating part 10 correlates coordinates in the space model MD and coordinates in one or more input image planes R4 that exist for each camera, and stores the coordinates in the space model MD, camera identifiers, and the coordinates in the input image planes R4 in association with one another in the input image-space model correspondence map 40.

Furthermore, the coordinates correlating part 10 performs a coordinate transformation operation using quaternions. Therefore, unlike in the case of performing a coordinate transformation operation using an Euler angle, the coordinates correlating part 10 has the advantage of causing no gimbal lock. The coordinates correlating part 10, however, is not limited to the one that performs a coordinate transformation operation using quaternions, and may perform a coordinate transformation operation using an Euler angle.

When it is possible to correlate the coordinates P (P') in the space model MD with coordinates in multiple input image planes R4, the coordinates correlating part 10 may correlate them with coordinates in the input image plane R4 related to a camera having the smallest angle of incidence α or coordinates in the input image plane R4 selected by the user.

Next, a description is given of the process of re-projecting coordinates in the second plane area R2 (coordinates having a component in the Z-axis direction) among the coordinates in the space model MD onto the processing object image plane R3 in the XY plane.

Figure 6A:
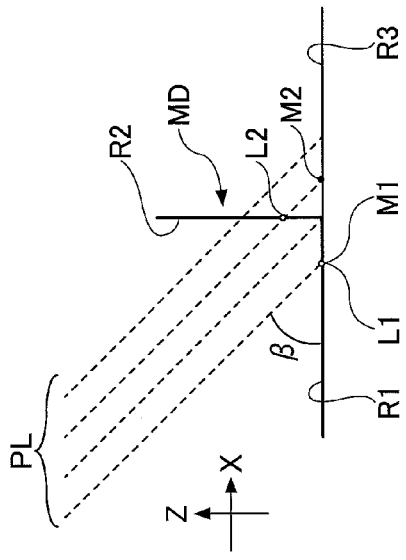
FIGS. 6A, 6B, 6C and 6D are diagrams for illustrating correlation of coordinates by a coordinates correlating part.

FIGS. 6A, 6B, 6C and 6D are diagrams for illustrating correlation of coordinates by the coordinates correlating part 10. Furthermore, FIG. 6A illustrates the correspondence between coordinates in the input image plane R4 of the camera 2 that employs normal projection (h=f tan α) and coordinates in the space model MD by way of example. In FIG. 6A, the coordinates correlating part 10 correlates coordinates in the input image plane R4 of the camera 2 and coordinates in the space model MD corresponding to the coordinates so that each of line segments connecting the coordinates passes through the optical center C of the camera 2.

In the case of FIG. 6A, the coordinates correlating part 10 correlates coordinates K1 in the input image plane R4 of the camera 2 with coordinates L1 in the first plane area R1 of the space model MD, and correlates coordinates K2 in the input image plane R4 of the camera 2 with coordinates L2 in the second plane area R2 of the space model MD. At this point, each of a line segment K1-L1 and a line segment K2-L2 passes through the optical center C.

When the camera 2 employs a projection system other than normal projection (for example, orthogonal projection, stereographic projection, equisolid angle projection, equidistant projection or the like), the coordinates correlating part 10 correlates the coordinates K1 and K2 in the input image plane R4 of the camera 2 with the coordinates L1 and L2 in the space model MD in accordance with the respective projection systems.

Specifically, the coordinates correlating part 10 correlates coordinates in the input image plane R4 with coordinates in the space model MD based on a predetermined function (for example, orthogonal projection (h=f sin α), stereographic projection (h=2f tan(α/2)), equisolid angle projection (h=2f sin(α/2)), equidistant projection (h=f—a) or the like). In this case, the line segment K1-L1 and the line segment K2-L2 do not pass through the optical center C of the camera 2.

Figure 6B:
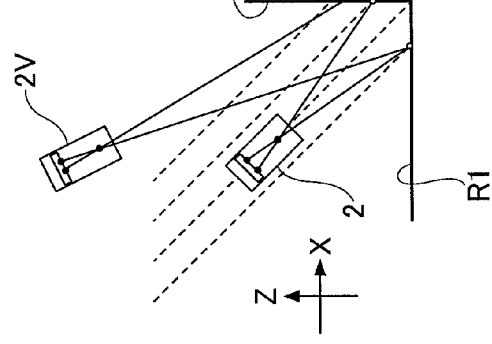

FIG. 6B illustrates the correspondence between coordinates in the second plane area R2 of the space model MD and coordinates in the processing object image plane R3. In FIG. 6B, the coordinates correlating part 10 introduces a group of parallel lines PL that are positioned in the XZ plane and form an angle β with respect to the processing object image plane R3. Then, the coordinates correlating part 10 correlates coordinates in the second plane area R2 of the space model MD and coordinates in the processing object image plane R3 corresponding to the coordinates so that both coordinates are disposed on one of the grouped parallel lines PL.

In the case of FIG. 6B, the coordinates correlating part 10 correlates the coordinates L2 in the second plane area R2 of the space model MD and coordinates M2 in the processing object image plane R3 so that both coordinates are disposed on a common parallel line.

It is possible for the coordinates correlating part 10 to correlate coordinates in the first plane area R1 of the space model MD with coordinates in the processing object image plane R3 using the group of parallel lines PL the same as in the case of coordinates in the second plane area R2. In the case of FIG. 6B, however, because the first plane area R1 and the processing object image plane R3 are in the same plane, there is no need to use the group of parallel lines PL. This is because the coordinates L1 in the first plane area R1 of the space model MD and the coordinates M1 in the processing object image plane R3 have the same coordinate values.

Thus, the coordinates correlating part 10 correlates coordinates in the space model MD and coordinates in the processing object image plane R3, and stores the coordinates in the space model MD and the coordinates in the processing object image plane R3 in association with each other in the space model-processing object image correspondence map 41.

Figure 6C:
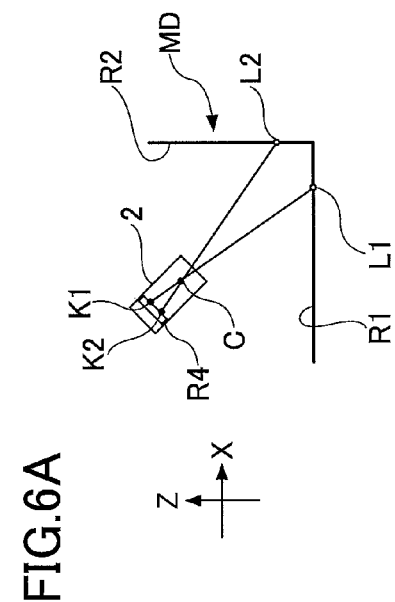

FIG. 6C illustrates the correspondence between coordinates in the processing object image plane R3 and, by way of example, coordinates in an output image plane R5 of a virtual camera 2V that employs normal projection (h=f tan α). In FIG. 6C, the output image generating part 11 correlates coordinates in the output image plane R5 of the virtual camera 2V and coordinates in the processing object image plane R3 corresponding to the coordinates so that each of line segments that connect both coordinates passes through an optical center CV of the virtual camera 2V.

In the case of FIG. 6C, the output image generating part 11 correlates coordinates N1 in the output image plane R5 of the virtual camera 2V with the coordinates M1 in the processing object image plane R3 (the first plane area R1 of the space model MD), and correlates coordinates N2 in the output image plane R5 of the virtual camera 2V with the coordinates M2 in the processing object image plane R3. At this point, each of a line segment M1-N1 and a line segment M2-N2 passes through the optical center CV of the virtual camera 2V.

When the virtual camera 2V employs a projection system other than normal projection (for example, orthogonal projection, stereographic projection, equisolid angle projection, equidistant projection or the like), the output image generating part 11 correlates the coordinates N1 and N2 in the output image plane R5 of the virtual camera 2V with the coordinates M1 and M2 in the processing object image plane R3 in accordance with the respective projection systems.

Specifically, the output image generating part 11 correlates coordinates in the output image plane R5 with coordinates in the processing object image plane R3 based on a predetermined function (for example, orthogonal projection (h=f sin α), stereographic projection (h=2f tan(α/2)), equisolid angle projection (h=2f sin(α/2)), equidistant projection (h=fα) or the like). In this case, the line segment M1-N1 and the line segment M2-N2 do not pass through the optical center CV of the virtual camera 2.

Thus, the output image generating part 11 correlates coordinates in the output image plane R5 and coordinates in the processing object image plane R3, and stores the coordinates in the output image plane R5 and the coordinates in the processing object image plane R3 in association with each other in the processing object image-output image correspondence map 42. Then, the output image generating part 11 generates an output image, associating the values of each pixel in the output image and the values of each pixel in the input image while referring to the input image-space model correspondence map 40 and the space model-processing object image correspondence map 41 stored by the coordinates correlating part 10.

Figure 6D:
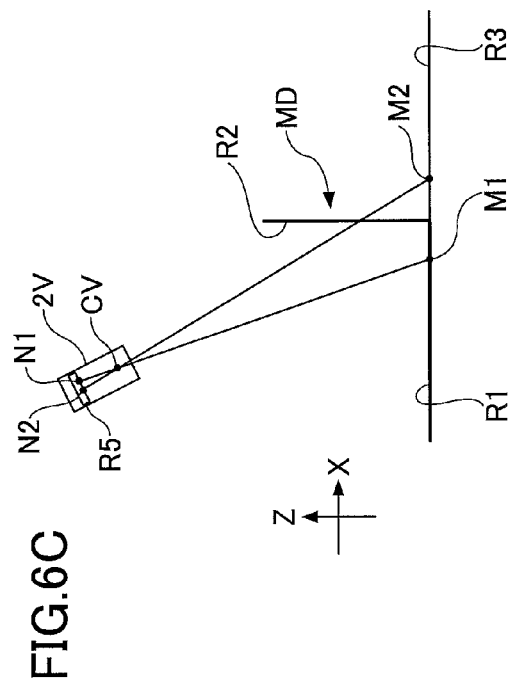

FIG. 6D is a diagram that combines FIGS. 6A through 6C, illustrating a mutual positional relation of the camera 2, the virtual camera 2, the first plane area R1 and the second plane area R2 of the space model MD, and the processing object image plane R3.

Figure 7A:
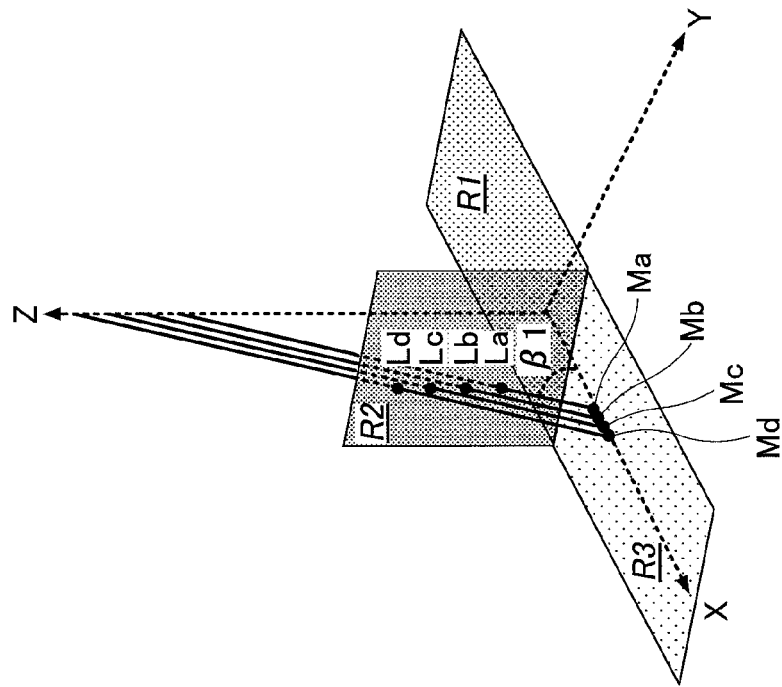
FIGS. 7A and 7B are diagrams for illustrating effects of a group of parallel lines.
Figure 7B:
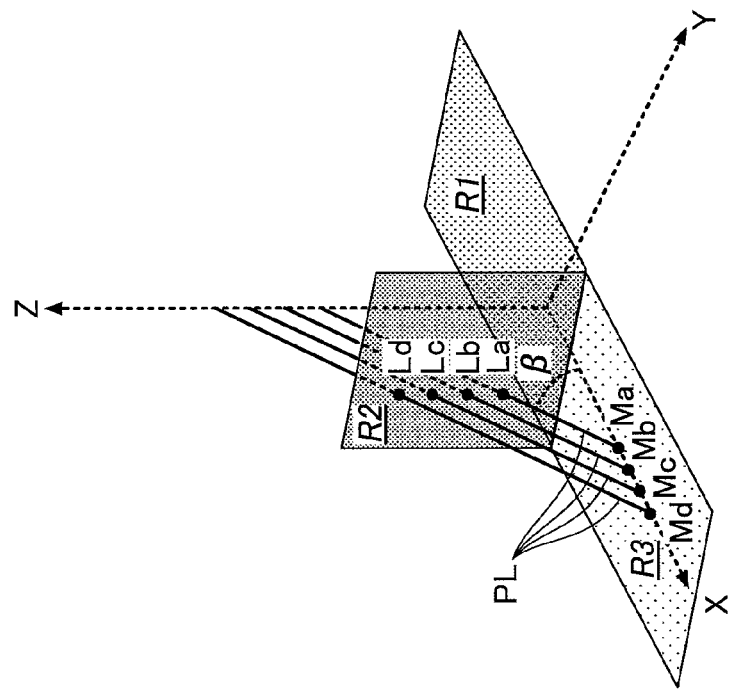

Next, a description is given, with reference to FIGS. 7A and 7B, of effects of the group of parallel lines PL that the coordinates correlating part 10 introduces in order to correlate coordinates in the space model MD and coordinates in the processing object image plane R3.

FIG. 7A is a diagram in the case where the angle β is formed between the group of parallel lines PL positioned in the XZ plane and the processing object image plane R3. FIG. 7B is a diagram in the case where an angle β1 (β1>β) is formed between the group of parallel lines PL positioned in the XZ plane and the processing object image plane R3. Furthermore, in FIGS. 7A and 7B, coordinates La through Ld in the second plane area R2 of the space model MD correspond to coordinates Ma through Md, respectively, in the processing object image plane R3. Furthermore, the respective intervals of the coordinates La through Ld in FIG. 7A are equal to the respective intervals of the coordinates La through Ld in FIG. 7B. It is assumed for explanatory purposes that the group of parallel lines PL are present in the XZ plane. In practice, however, the group of parallel lines PL are present so as to radially extend from every point on the Z-axis toward the processing object image plane R3. The Z-axis in this case is referred to as "re-projection axis."

As illustrated in FIGS. 7A and 7B, the respective intervals of the coordinates Ma through Md in the processing object image plane R3 linearly decrease (uniformly decrease irrespective of the respective distances between the second plane area R2 of the space model MD and the coordinates Ma through Md) as the angle between the group of parallel lines PL and the processing object image plane R3 increases. On the other hand, with respect to a group of coordinates in the first plane area R1 of the space model MD, the intervals of the grouped coordinates do not change in the case of FIGS. 7A and 7B because no transformation to the group of coordinates in the processing object image plane R3 is performed.

These changes in the intervals of the group of coordinates mean that of the image portions in the output image plane R5 (see FIG. 6C), only the image portion corresponding to the image projected onto the second plane area R2 of the space model MD is linearly enlarged or reduced.

Next, a description is given, with reference to FIGS. 8A and 8B, of an alternative to the group of parallel lines PL that the coordinates correlating part 10 introduces in order to correlate coordinates in the space model MD and coordinates in the processing object image plane R3.

FIG. 8A is a diagram in the case where a group of auxiliary lines AL all extend from a starting point T1 on the Z-axis toward the processing object image plane R3. FIG. 8B is a diagram in the case where the group of auxiliary lines AL all extend from a starting point T2 (T2>T1) on the Z-axis toward the processing object image plane R3. Furthermore, the coordinates La through Ld in the second plane area R2 of the space model MD in FIGS. 8A and 8B corresponds to the coordinates Ma through Md in the processing object image plane R3, respectively. (In the case of FIG. 8A, the coordinates Mc and Md are outside the area of the processing object image plane R3 and are accordingly not graphically represented.) Furthermore, the respective intervals of the coordinates La through Ld in FIG. 8A are equal to the respective intervals of the coordinates La through Ld in FIG. 8B. It is assumed for explanatory purposes that the group of auxiliary lines AL are present in the XZ plane. In practice, however, the group of auxiliary lines AL are present so as to radially extend from an arbitrary point on the Z-axis toward the processing object image plane R3. Like in FIGS. 7A and 7B, the Z-axis in this case is referred to as "re-projection axis."

As illustrated in FIGS. 8A and 8B, the respective intervals of the coordinates Ma through Md in the processing object image plane R3 non-linearly decrease as the distance (height) between the starting point of the group of auxiliary lines AL and the origin O. (The reduction of the intervals increases as the distance between the second plane area R2 of the space model MD and the coordinates Ma through Md increases.) On the other hand, with respect to a group of coordinates in the first plane area R1 of the space model MD, the intervals of the grouped coordinates do not change in the case of FIGS. 8A and 8B because no transformation to the group of coordinates in the processing object image plane R3 is performed.

Like in the case of the group of parallel lines PL, these changes in the intervals of the group of coordinates mean that of the image portions in the output image plane R5 (see FIG. 6C), only the image portion corresponding to the image projected onto the second plane area R2 of the space model MD is non-linearly enlarged or reduced.

Thus, the image generating apparatus 100 can linearly or non-linearly enlarge or reduce an image portion (for example, a distant view image) of the output image corresponding to the image projected onto the second plane area R2 of the space model MD without affecting an image portion (for example, a road surface image) of the output image corresponding to the image projected onto the first plane area R1 of the space model MD. Therefore, the image generating apparatus 100 can swiftly and flexibly enlarge or reduce an object positioned in front of the asphalt finisher 60 (an object in an image in the case of horizontally looking forward from the asphalt finisher 60) without affecting an image of a road surface near the asphalt finisher 60 on its right side and left side (a virtual image in the case of viewing the asphalt finisher 60 from directly above), and can improve the visibility of blind areas of the asphalt finisher 60.

Figure 9:
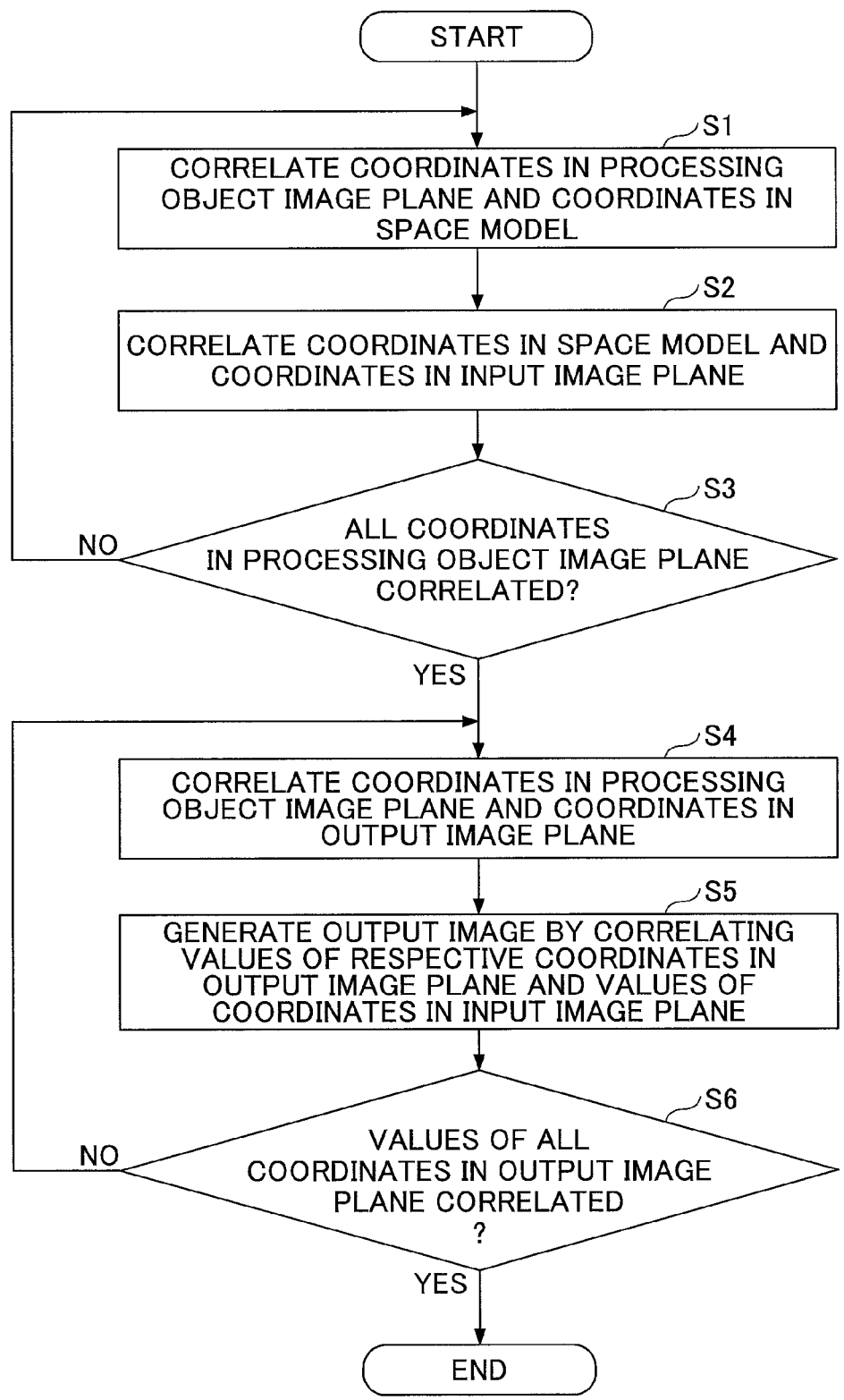
FIG. 9 is a flowchart illustrating a flow of a processing object image generation process and an output image generation process.

Next, a description is given, with reference to FIG. 9, of the process of generating a processing object image (hereinafter, "processing object image generation process") and the process of generating an output image using the generated processing object image (hereinafter, "output image generation process") by the image generating apparatus 100. FIG. 9 is a flowchart illustrating a flow of the processing object image generation process (step S1 through step S3) and the output image generation process (step S4 through step S6). Furthermore, the disposition of the cameras 2 (the input image planes R4), the space model MD (the first plane area R1 and the second plane area R2), and the processing object image plane R3 is predetermined. Furthermore, the image generating apparatus 100 executes the processing object image generation process and the output image generation process every time the cameras 2 obtain an input image.

First, the coordinates correlating part 10 of the control part 1 correlates coordinates in the processing object image plane R3 and coordinates in the space model MD (step S1).

Specifically, the coordinates correlating part 10 obtains an angle formed between the group of parallel lines PL and the processing object image plane R3, and calculates a point at which one of the grouped parallel lines PL extending from one set of coordinates in the processing object image plane R3 intersects the second plane area R2 of the space model MD. Then, the coordinates correlating part 10 derives coordinates in the second plane area R2 corresponding to the calculated point as one set of coordinates in the second plane area R2 that corresponds to the one set of coordinates in the processing object image plane R3, and stores the correspondence in the space model-processing object image correspondence map 41. The angle formed between the group of parallel lines PL and the processing object image plane R3 may be a value prestored in the storage part 4 or the like, or may be a value dynamically input by the user via the input part 3.

Furthermore, when one set of coordinates in the processing object image plane R3 coincides with one set of coordinates in the first plane area R1 of the space model MD, the coordinates correlating part 10 derives the one set of coordinates in the first plane area R1 as one set of coordinates corresponding to the one set of coordinates in the processing object image plane R3, and stores the correspondence in the space model-processing object image correspondence map 41.

Thereafter, the coordinates correlating part 10 of the control part 1 correlates the one set of coordinates derived by the above-described process with coordinates in the input image plane R4 (step S2).

Specifically, the coordinates correlating part 10 obtains the coordinates of the optical center C of a camera 2 that employs normal projection (h=f tan α), and calculates a point at which a line segment that extends from one set of coordinates in the space model MD and passes through the optical center C intersects the input image plane R4. Then, the coordinates correlating part 10 derives coordinates in the input image plane R4 corresponding to the calculated point as one set of coordinates in the input image plane R4 that corresponds to the one set of coordinates in the space model MD, and stores the correspondence in the input image-space model correspondence map 40.

Thereafter, the control part 1 determines whether all coordinates in the processing object image plane R3 are correlated with coordinates in the input image planes R4 (step S3). Then, in response to determining that all coordinates are not yet correlated (NO at step S3), the control part 1 repeats the process of step S1 and step S2.

On the other hand, in response to determining that all coordinates are correlated (YES at step S3), the control part 1 starts the output image generation process after ending the processing object image generation process. Then, the output image generating part 11 of the control part 1 correlates coordinates in the processing object image plane R3 and coordinates in the output image plane R5 (step S4).

Specifically, the output image generating part 11 generates an output image by performing a scale transformation, an affine transformation, or a distortion transformation on a processing object image. Then, the output image generating part 11 stores the correspondence between coordinates in the processing object image plane R3 and coordinates in the output image plane R5 that is determined by the details of the performed scale transformation, affine transformation or distortion transformation in the processing object image-output image correspondence map 42.

Alternatively, in the case of generating an output image using the virtual camera 2V, the output image generating part 11 may calculate coordinates in the output image plane R5 from coordinates in the processing object image plane R3 in accordance with the employed projection system, and store the correspondence in the processing object image-output image correspondence map 42.

As another alternative, in the case of generating an output image using the virtual camera 2V that employs normal projection (h=f tan α), the output image generating part 11 obtains the coordinates of the optical center CV of the virtual camera 2V. Thereafter, the output image generating part 11 calculates a point at which a line segment that extends from one set of coordinates in the output image plane R5 and passes through the optical center CV intersects the processing object image plane R3. Then, the output image generating part 11 may derive coordinates in the processing object image plane R3 corresponding to the calculated point as one set of coordinates in the processing object image plane R3 that corresponds to the one set of coordinates in the output image plane R5, and store the correspondence in the processing object image-output image correspondence map 42.

Thereafter, the output image generating part 11 of the control part 1 traces the correspondence between coordinates in the input image planes R4 and coordinates in the space model MD, the correspondence between coordinates in the space model MD and coordinates in the processing object image plane R3, and the correspondence between coordinates in the processing object image plane R3 and coordinates in the output image plane R5, referring to the input image-space model correspondence map 40, the space model-processing object image correspondence map 41, and the processing object image-output image correspondence map 42. Then, the output image generating part 11 obtains the values (for example, the luminance value, hue value, saturation value, etc.) possessed by coordinates in the input image planes R4 corresponding to the respective sets of coordinates in the output image plane R5, and employs the obtained values as the values of the corresponding coordinates in the output image plane R5 (step S5). When multiple sets of coordinates in the input image planes R4 correspond to one set of coordinates in the output image plane R5, the output image generating part 11 may derive statistical values (for example, average values, maximum values, minimum values, intermediate values or the like) based on the values of the sets of coordinates in the input image planes R4, and employ the statistical values as the values of the one set of coordinates in the output image plane R4.

Thereafter, the control part 1 determines whether the values of all coordinates in the output image plane R5 are correlated with the values of coordinates in the input image planes R4 (step S6). In response to determining that the values of all coordinates are not yet correlated (NO at step S6), the control part 1 repeats the process of step S4 and step S5.

On the other hand, in response to determining that the values of all coordinates are correlated (YES at step S6), the control part 1 generates an output image and ends the series of processes.

In the case of generating no processing object image, the image generating apparatus 100 omits the processing object image generation process. In this case, "coordinates in the processing object image plane" at step S4 in the output image generation process may read "coordinates in the space model."

The above-described configuration makes it possible for the image generating apparatus 100 to generate a processing object image and an output image that enable the user to intuitively understand the positional relationship between the asphalt finisher 60 and surrounding obstacles including workers by combining input images obtained by multiple cameras.

Furthermore, the image generating apparatus 100 displays a road surface image that is an overhead view of a continuous area including the entire hopper part 62 and the right and left ends of the screed part 63 as part of the output image. This makes it possible for the user to view blind areas around the asphalt finisher 60 without leaving the operator seat 64. As a result, the image generating apparatus 100 can improve the safety and operability of the asphalt finisher 60. Specifically, the image generating apparatus 100 can show the amount of asphalt mixture remaining in the hopper part 62, the positions of terrestrial objects (for example, manholes) on a road surface to be paved, etc., to the user. Furthermore, the image generating apparatus 100 can show the positions of workers who work around the asphalt finisher 60 to the user. Therefore, it is possible for the user to perform various kinds of operations such as opening or closing the hopper part 62, extending or contracting the screed part 63, and elevating or lowering the screed part 63 after checking the positions of terrestrial objects or workers by looking at the display part 5. Furthermore, it is possible for the user to stop operations or stop the asphalt finisher 60 when sensing danger in the relationship between workers and the hopper part 62, the screed part 63 or a dump truck.

Furthermore, the image generating apparatus 100 correlates coordinates in such a manner as to trace back from the processing object image plane R3 to the input image planes R4 via the space model MD. This makes it possible for the image generating apparatus 100 to ensure correlation of coordinates in the processing object image plane R3 with one or more sets of coordinates in the input image planes R4. Therefore, the image generating apparatus 100 can swiftly generate a processing object image of better quality compared with the case of correlating coordinates in order going from the input image planes R4 to the processing object image plane R3 via the space model MD. In the case of correlating coordinates in order going from the input image planes R4 to the processing object image plane R3 via the space model MD, it is possible for the image generating apparatus 100 to ensure correlation of each set of coordinates in the input image planes R4 with one or more sets of coordinates in the processing object image plane R3. Some coordinates in the processing object image plane R3, however, may not be correlated with any coordinates in the input image planes R4. In this case, it is necessary to perform interpolation on those coordinates in the processing object image plane R3.

Furthermore, in the case of enlarging or reducing only an image corresponding to the second plane area R2 of the space model MD, the image generating apparatus 100 may update only part of the space model-processing object image correspondence map 41 that is related to the second plane area R2 by changing the angle formed between the group of parallel lines PL and the processing object image plane R3. That is, the image generating apparatus 100 can achieve desired enlargement or reduction without changing the contents of the input image-space model correspondence map 40.

Furthermore, in the case of changing the appearance of the output image, the image generating apparatus 100 may only update the processing object image-output image correspondence map 42 by changing the values of parameters related to a scale transformation, an affine transformation, or a distortion transformation. That is, the image generating apparatus 100 can generate a desired output image (an image subjected to a scale transformation, an image subjected to an affine transformation, or an image subjected to a distortion transformation) without changing the contents of the input image-space model correspondence map 40 and the space model-processing object image correspondence map 41.

Likewise, in the case of changing a viewpoint of the output image, the image generating apparatus 100 may only update the processing object image-output image correspondence map 42 by changing the values of parameters of the virtual camera 2V. That is, the image generating apparatus 100 can generate an output image viewed from a desired viewpoint (an image subjected to a viewpoint transformation) without changing the contents of the input image-space model correspondence map 40 and the space model-processing object image correspondence map 41.

Figure 10:
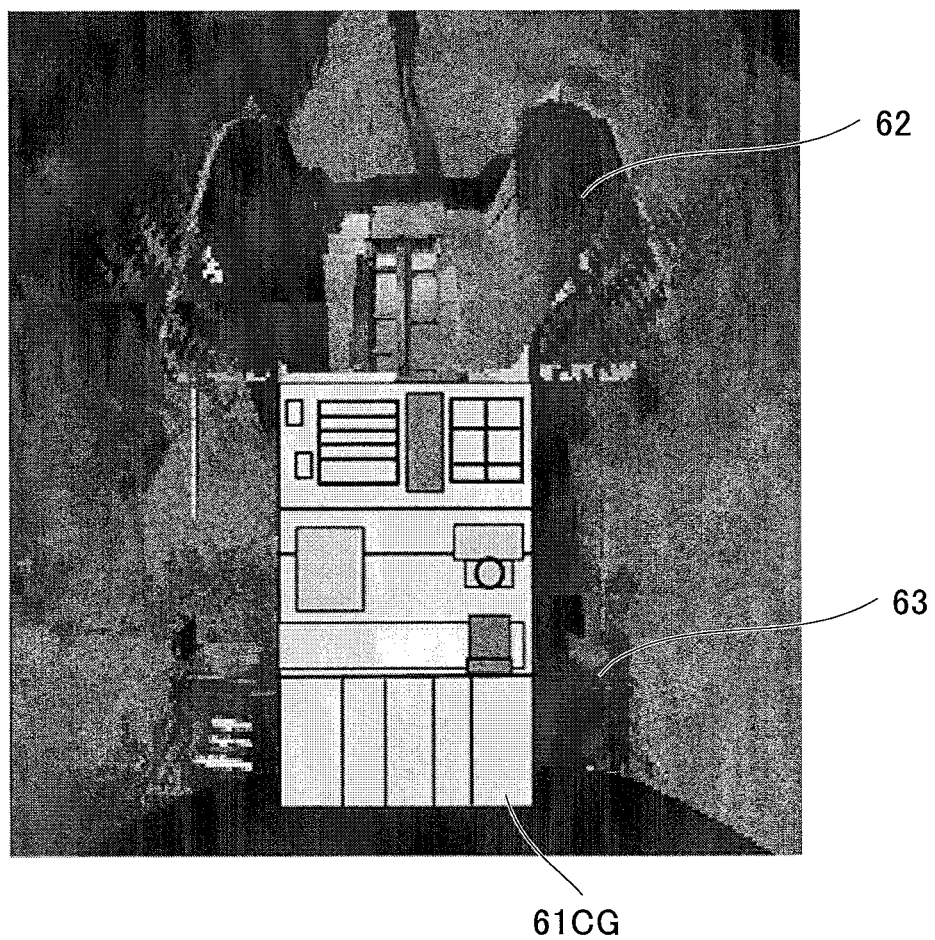
FIG. 10 illustrates a display example of an output image.
Figure 11:
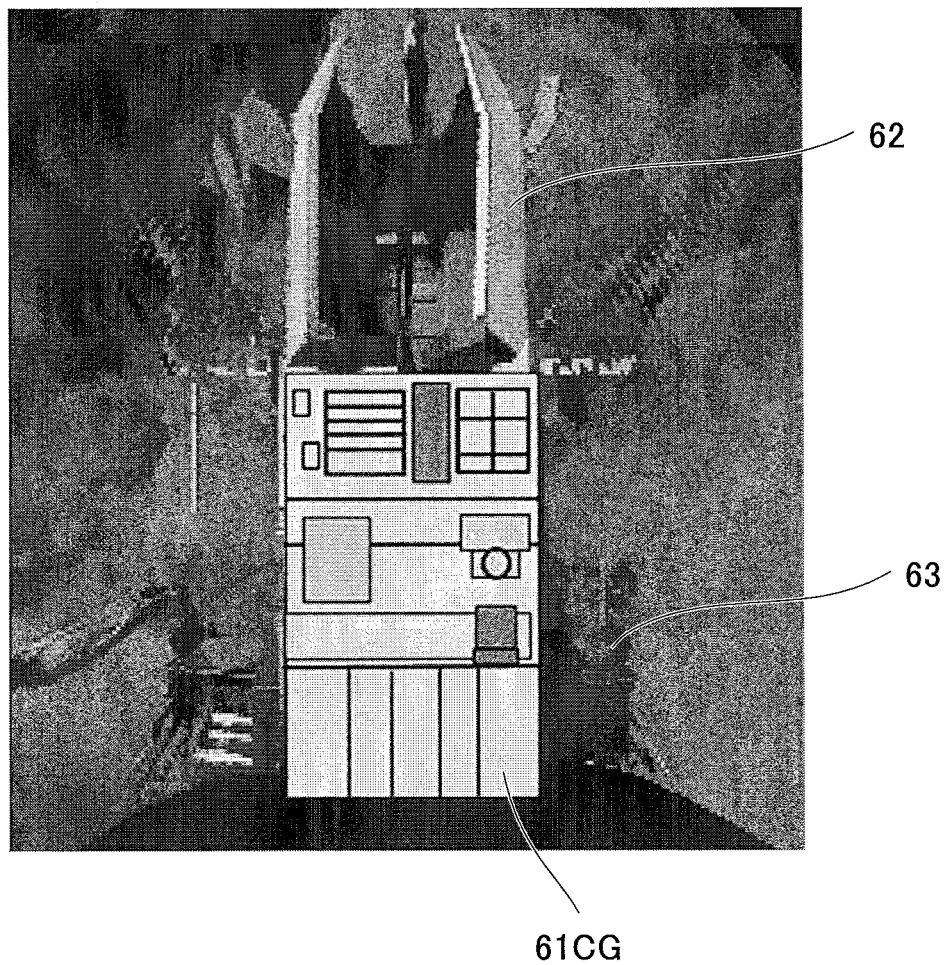
FIG. 11 illustrates another display example of the output image.

FIG. 10 and FIG. 11 are display examples in the case of having an output image generated using input images of the three cameras 2 (the left-side-part camera 2L, the right-side-part camera 2R, and the front camera 2F) mounted on the asphalt finisher 60 displayed on the display part 5. The output image of FIG. 10 illustrates the state of the asphalt finisher 60 with the hopper part 62 fully open. The output image of FIG. 11 illustrates the state of the asphalt finisher 60 with the hopper part 62 closed.

The image generating apparatus 100 projects the respective input images of the three cameras 2 onto the first plane area R1 and the second plane area R2 of the space model MD. Thereafter, the mage generating apparatus 100 generates a processing object image by re-projecting the projected images onto the processing object image plane R3. Then, the image generating apparatus 100 generates an output image by performing image conversion (for example, a scale transformation, an affine transformation, a distortion transformation, a viewpoint transformation, etc.) on the generated processing object image. An image of the neighborhood of the asphalt finisher 60 viewed down from above (an image in the first plane area R1) and an image horizontally looking forward from the asphalt finisher 60 (an image in the processing object image plane R3) are simultaneously displayed in the output image.

In the case where the image generating apparatus 100 generates no processing object image, the output image is generated by performing image conversion (for example, a viewpoint transformation) on the images projected onto the space model MD.

Furthermore, it is desirable that a computer graphics (CG) image 61CG of the tractor part 61 of the asphalt finisher 60 be disposed in the output image so that the front of the asphalt finisher 60 coincides with the top of the screen of the display part 5. This is for making the positional relationship between the asphalt finisher 60 and an object appearing in the output image easier to understand. A frame image including various kinds of information such as directions may be disposed around the output image.

Next, a description is given, with reference to FIG. 12 through FIG. 15, of the process of making the unnaturalness of an image in an overlap area between input images inconspicuous by the image generating apparatus 100 (hereinafter, "overlap area correction process").

Figure 12:
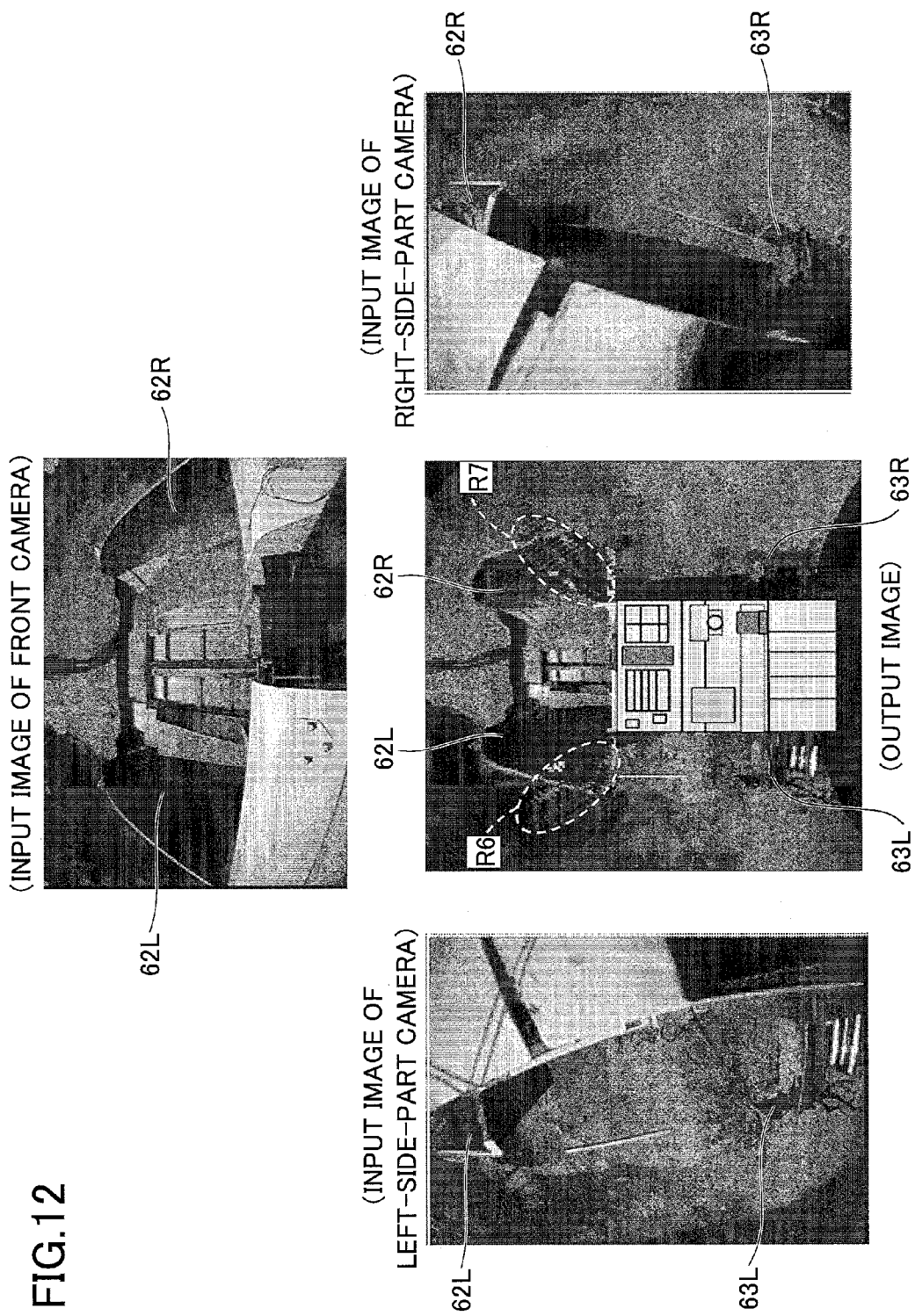
FIG. 12 illustrates yet another display example of the output image.

FIG. 12 is a diagram illustrating respective input images of the three cameras 2 (the left-side-part camera 2L, the right-side-part camera 2R, and the front camera 2F) mounted on the asphalt finisher 60 and an output image generated using the input images. The input image of the left-side-part camera 2L includes an image 62L of the left side of the hopper part 62 and an image 63L of the left side of the screed part 63. The input image of the right-side-part camera 2R includes an image 62R of the right side of the hopper part 62 and an image 63R of the right side of the screed part 63. The input image of the front camera 2F includes the image 62L of the left side of the hopper part 62 and the image 62R of the right side of the hopper part 62.

The image generating apparatus 100 generates a processing object image by projecting the respective input images of the three cameras 2 onto the first plane area R1 and the second plane area R2 of the space model MD and thereafter re-projecting the projected images onto the processing object image plane R3. Then, the image generating apparatus 100 generates an output image by performing image conversion (for example, a scale transformation, an affine transformation, a distortion transformation, a viewpoint transformation, etc.) on the generated processing object image. Thus, the image generating apparatus 100 simultaneously displays an image of the neighborhood of the asphalt finisher 60 viewed down from above (an image in the first plane area R1) and an image horizontally looking forward from the asphalt finisher 60 (an image in the processing object image plane R3) are simultaneously displayed in the output image.

In FIG. 12, each of the input image of the left-side-part camera 2L and the input image of the front camera 2F includes an overlap part of images of the same location captured from different angles. The same is the case with an overlap part between the input image of the right-side-part camera 2R and the input image of the front camera 2F.

Therefore, when it is possible to correlate coordinates in the output image plane with coordinates in the multiple input image planes, the output image generated based on the three input images appears unnatural if coordinates in the output image plane are correlated with coordinates in the input image plane of the camera having the smallest angle of incidence. Specifically, the shape of the hopper part 62 becomes distorted (discontinuous) at the boundary between an area based on the input image of the left-side-part camera 2L in the output image and an area based on the input image of the front camera 2F in the output image and the boundary between an area based on the input image of the right-side-part camera 2R in the output image and the area based on the input image of the front camera 2F in the output image. Thus, the output image appears unnatural to the user. Furthermore, as described below with reference to FIG. 16, images of objects existing at the boundaries are caused to disappear from the output image.

Figure 13:
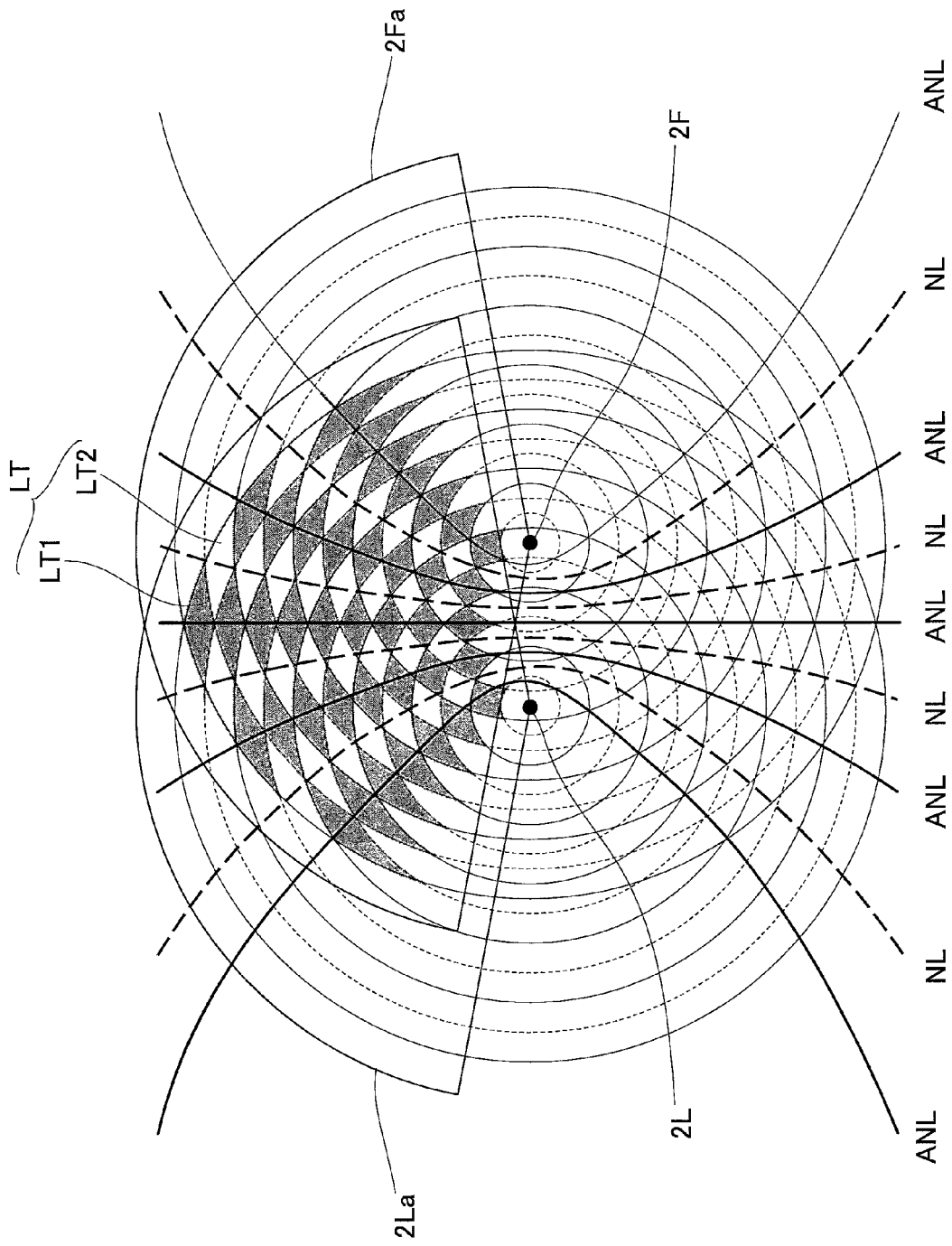
FIG. 13 is a diagram for illustrating a method of generating a lattice pattern.

Therefore, the image generating apparatus 100 performs the overlap area correction process. FIG. 13 is a diagram for illustrating an example of the overlap area correction process. FIG. 13 illustrates two waves that spread from two wave sources (for example, the left-side-part camera 2L and the front camera 2F) while forming peaks (solid-line circles) and troughs (broken-line circles), so as to interfere with each other.

Further, in FIG. 13, two sectorial areas 2La and 2Fa represent the imaging range of the left-side-part camera 2L and the imaging range of the right-side-part camera 2R, respectively, antinodal lines ANL expressed by bold solid lines indicate lines connecting points at which the two waves strengthen each other, and nodal lines NL expressed by bold broken lines indicate lines connecting points at which the two waves weaken each other. As illustrated in FIG. 13, the antinodal lines ANL and the nodal lines NL alternately appear.

Furthermore, in FIG. 13, each of rhombic areas defined by a line (broken-line circle) drawn by one trough of a wave spreading from the left-side-part camera 2L serving as a wave source, a line (solid-line circle) drawn by one peak generated subsequently to the trough, a line (broken-line circle) drawn by one trough of a wave spreading from the front camera 2F serving as a wave source, and a line (solid-line circle) drawn by one peak generated subsequently to the trough forms a unit pattern area LT.

When the unit pattern areas LT illustrated in FIG. 13 are drawn on the output image plane, the input image of the front camera 2F is correlated with unit pattern areas LT1 (filled with gray) that are those of the unit pattern areas LT through which the antinodal lines ANL pass, and the input image of the left-side camera 2L is correlated with unit pattern areas LT2 (filled with white) that are those of the unit pattern areas LT through which the nodal lines NL pass, the two input images form a lattice pattern.

Likewise, in the case where the input image of the left-side camera 2L is correlated with the unit pattern areas LT1 (filled with gray), which are those of the unit pattern areas LT through which the antinodal lines ANL pass, and the input image of the front camera 2F is correlated with the unit pattern areas LT2 (filled with white), which are those of the unit pattern areas LT through which the nodal lines NL pass as well, the two input images form a lattice pattern.

Furthermore, while the lattice pattern of FIG. 13 is formed using two waves that are equal in wavelength and phase, the lattice pattern may alternatively be formed using two waves that are different in one or both of wavelength and phase. This is for making it possible to flexibly adjust the size and shape of the unit pattern areas LT1 and LT2.

Figure 14:
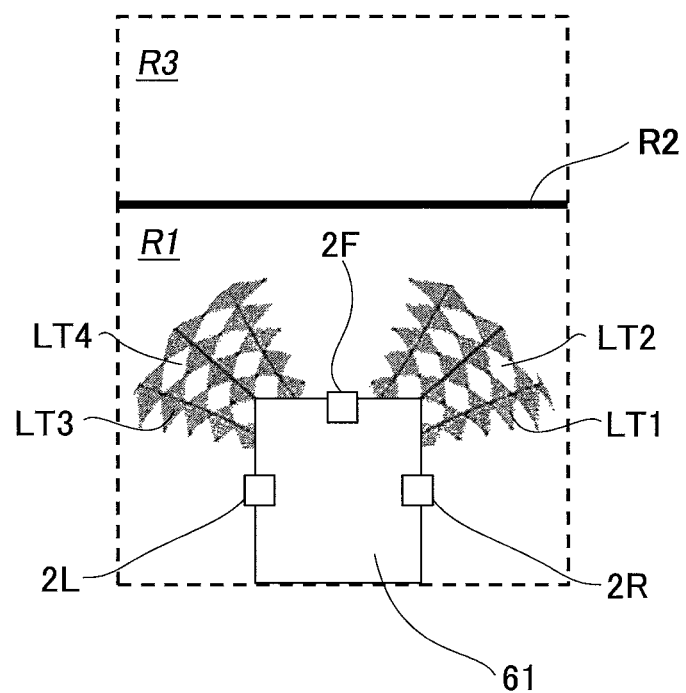
FIG. 14 is a diagram illustrating a state where the lattice pattern of FIG. 13 is disposed on an output image plane.

FIG. 14 illustrates a state where the lattice pattern illustrated in FIG. 13 is disposed on the output image plane and illustrates a lattice pattern disposed at the overlap area of the imaging range of the right-side-part camera 2R and the imaging range of the front camera 2F, situated on the right front side (upper right side in the drawing) of the CG image 61CG of the tractor part 61 and a lattice pattern disposed at the overlap area of the imaging range of the left-side-part camera 2L and the imaging range of the front camera 2F, situated on the left front side (upper left side in the drawing) of the CG image 61CG of the tractor part 61.

In FIG. 14, in the lattice pattern disposed at the overlap area of the imaging range of the right-side-part camera 2R and the imaging range of the front camera 2F, for example, the input image of the right-side-part camera 2R is correlated with the unit pattern areas LT1 (filled with gray) and the input image of the front camera 2F is correlated with the unit pattern areas LT2 (filled with white).

Furthermore, in the lattice pattern disposed at the overlap area of the imaging range of the left-side-part camera 2L and the imaging range of the front camera 2F, for example, the input image of the left-side-part camera 2L is correlated with unit pattern areas LT3 (filled with gray) and the input image of the front camera 2F is correlated with unit pattern areas LT4 (filled with white).

Figure 15:
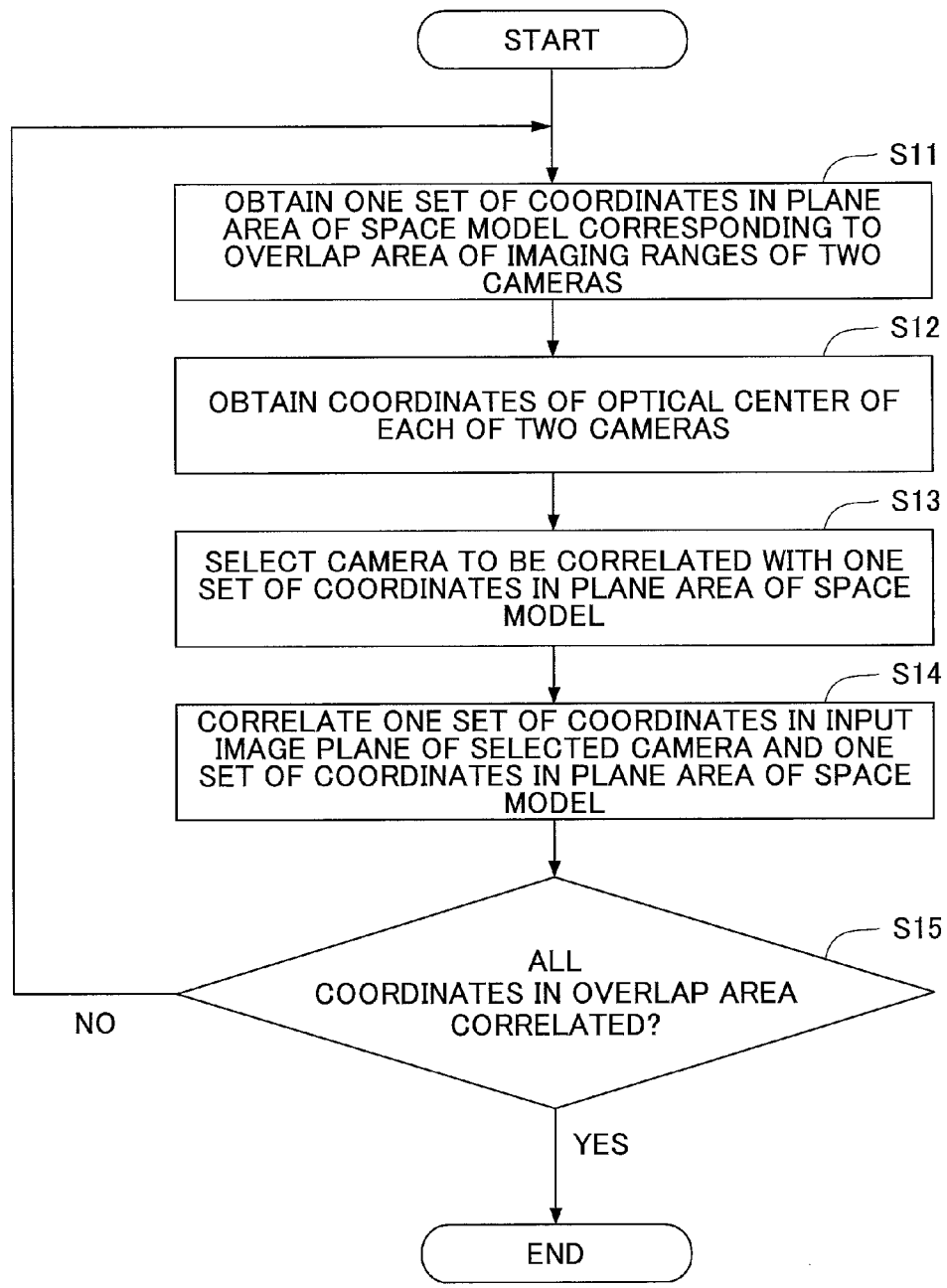
FIG. 15 is a flowchart illustrating a flow of a lattice pattern formation process.

FIG. 15 is a flowchart illustrating a flow of the process of forming a lattice pattern by correlating coordinates in the input image plane of one of two cameras with coordinates in the output image plane corresponding to the overlap area of the respective imaging ranges of the two cameras by the image generating apparatus 100 (hereinafter, "lattice pattern formation process").

The control part 1 of the image generating apparatus 100 executes this lattice pattern formation process when, for example, it is possible to correlate one set of coordinates in the first plane area R1 of the space model MD with coordinates in multiple input image planes at step S2 of the processing object image generation process of FIG. 9. Specifically, the coordinates correlating part 10 of the control part 1 executes this lattice pattern formation process when correlating one set of coordinates in the first plane area R1 of the space model MD with one set of coordinates in one of two input image planes corresponding to two cameras.

First, the control part 1 obtains one set of coordinates in the first plane area R1 of the space model MD that corresponds to an area where the imaging ranges of two cameras (for example, the right-side-part camera 2R and the front camera 2F) overlap (step S11).

Next, the control part 1 obtains the coordinates of the optical center of each of the two cameras (step S12).

Next, the control part 1 selects a camera to be correlated with the one set of coordinates in the first plane area R1 of the space model MD obtained at step S11 (step S13).

Specifically, the case is assumed where the coordinates of the optical center of the right-side-part camera 2R is (Xcam1, Ycam1), the coordinates of the optical center of the front camera 2F is (Xcam2, Ycam2), and the one set of coordinates in the first plane area R1 of the space model MD, which is a target of correlation, is (Xtarget, Ytarget). In this case, the control part 1 selects the right-side-part camera 2R as a camera to be correlated with the one set of coordinates in the first plane area R1 if the conditional expression expressed by:

$$0 < \sin(\sqrt{(X_{cam1}-X_{target})^2 + (Y_{cam1}-Y_{target})^2}) \times \sin(\sqrt{(X_{cam2}-X_{target})^2 + (Y_{cam2}-Y_{target})^2})$$

is true, and selects the front camera 2F as a camera to be correlated with the one set of coordinates in the first plane area R1 if the above-described conditional expression is false.

Alternatively, the control part 1 may select the front camera 2F as a camera to be correlated with the one set of coordinates in the first plane area R1 if the above-described conditional expression is true and select the right-side-part camera 2R as a camera to be correlated with the one set of coordinates in the first plane area R1 if the above-described conditional expression is false.

The above-described conditional expression corresponds to a formula for determining whether the coordinates (Xtarget, Ytarget) in the first plane area R1 are included in the unit pattern areas LT1 or included in the unit pattern areas LT2 illustrated in FIG. 14.

Furthermore, according to this embodiment, the control part 1 selects the camera based on the two-dimensional distance between the one set of coordinates (two-dimensional coordinates) in the first plane area R1 and the coordinates (two-dimensional coordinates projected onto a plane including the first plane area R1) of the optical center of each of the two cameras on the basis that the coordinates of the optical centers are two-dimensional coordinates and that waves generated from the wave sources are planar waves. Alternatively, however, while letting the coordinates of the optical centers be three-dimensional coordinates (including height information) and letting waves generated from the wave sources be spherical waves, the control part 1 may select the camera based on the three-dimensional distance between the one set of coordinates (three-dimensional coordinates) in the first plane area R1 and the coordinates (three-dimensional coordinates) of the optical center of each of the two cameras.

Furthermore, according to this embodiment, the control part 1 selects a camera to be correlated with one set of coordinates in the first plane area R1 of the space model MD that corresponds to an area where the imaging ranges of two cameras (for example, the right-side-part camera 2R and the front camera 2F) overlap. The control part 1, however, may also similarly select a camera to be correlated with one set of coordinates in the second plane area R2 that corresponds to an area where the imaging ranges of two cameras overlap and a camera to be correlated with one set of coordinates in the processing object image plane R3.

In this case, the control part 1 may select the camera based on the two-dimensional distance between the one set of coordinates (two-dimensional coordinates) in the processing object image plane R3 and the coordinates of the optical center of each of the two cameras (two-dimensional coordinates projected onto a plane including the processing object image plane R3) or may select the camera based on the three-dimensional distance between the one set of coordinates (three-dimensional coordinates) in the processing object image plane R3 and the coordinates (three-dimensional coordinates) of the optical center of each of the two cameras. The processing object image plane R3 may include the first plane area R1.

Thereafter, the coordinates correlating part 10 correlates one set of coordinates in the input image plane of the selected camera with one set of coordinates in the first plane area R1 of the space model MD (step S14), and stores the coordinates in the space model MD, a camera identifier, and the coordinates in the input image plane in association with one another in the input image-space model correspondence map 40.

Thereafter, the control part 1 determines whether all coordinates in the first plane area R1 of the space model MD that correspond to the area where the imaging ranges of the two cameras overlap are correlated with coordinates in the input image plane of the one of the two cameras (step S15). Then, in response to determining that all coordinates are not yet correlated (NO at step S15), the control part 1 repeats the process of step S11 through step S14.

On the other hand, in response to determining that all coordinates are correlated (YES at step S15), the control part 1 ends this lattice pattern formation process.

Thus, the control part 1 can easily correlate each set of coordinates in the space model MD with coordinates in the input image plane of one of the two cameras using the above-described conditional expression, and generate an appropriate lattice pattern.

Here, referring again to FIG. 12, an area R6 surrounded by a one-dot chain line of FIG. 12, including the boundary between the area based on the input image of the left-side-part camera 2L in the output image and the area based on the input image of the front camera 2F in the output image, is illustrated. Because of the lattice pattern generated as described above, the area R6 prevents the shape of the hopper part 62 from being distorted (discontinuous) so as to reduce unnaturalness felt by the user who views the output image including the area R6. The same is the case with an area R7 surrounded by a one-dot chain line of FIG. 12, including the boundary between the area based on the input image of the right-side-part camera 2R in the output image and the area based on the input image of the front camera 2F in the output image.

According to the above-described embodiment, the right and left corners of the rear end of the hopper part 62 are included in the areas where a lattice pattern is formed. Alternatively, the image generating apparatus 100 may exclude the right and left corners of the rear end of the hopper part 62 from the areas where a lattice pattern is formed. Specifically, the image generating apparatus 100 detects the opening or closing state of the hopper part 62 by detecting the state of a hydraulic cylinder that controls the opening and closing of the hopper part 62. Then, the image generating apparatus 100 projects the input image of the front camera 2F onto an area in the space model MD in which the right and left corners of the rear end of the hopper part 62 are positioned, which area is determined by the opening or closing state of the hopper part 62. Then, the image generating apparatus 100 causes a lattice pattern to be formed in areas in the space model MD corresponding to the outside of the right and left corners of the rear end of the hopper part 62. As a result, the image generating apparatus 100 can properly display overlap areas while preventing the shape of the hopper part 62 from being distorted (discontinuous).

Next, a description is given, with reference to FIG. 16 through FIG. 18, of the process of preventing, by the image generating apparatus 100, an object in part of an output image that corresponds to the overlap area of the imaging ranges of two cameras from disappearing when generating the part of the output image.

FIG. 16 illustrates part input images in the overlap area of the respective imaging ranges of the left-side-part camera 2L and the front camera 2F of the three cameras mounted on the asphalt finisher 60, and a part output image generated using the part input images.

In FIG. 16, each of a part input image R10 of the left-side-part camera 2L and a part input image R11 of the front camera 2F is part of an image that belongs to the overlap area of the imaging range of the left-side-part camera 2L and the front camera 2F, and captures a person.

When, however, coordinates in the output image plane of the part output image R12, generated based on the part input image R10 of the left-side-part camera 2L and the part input image R11 of the front camera 2F, are correlated with coordinates in the input image plane of the camera that has the smallest angle of incidence, the person in the overlap area is caused to disappear as illustrated in FIG. 16.

Therefore, in generating part of an output image that corresponds to the overlap area of the imaging ranges of two cameras, the image generating apparatus 100 prevents an object in the part of the output image from disappearing using the above-described lattice pattern.

Figure 17A:
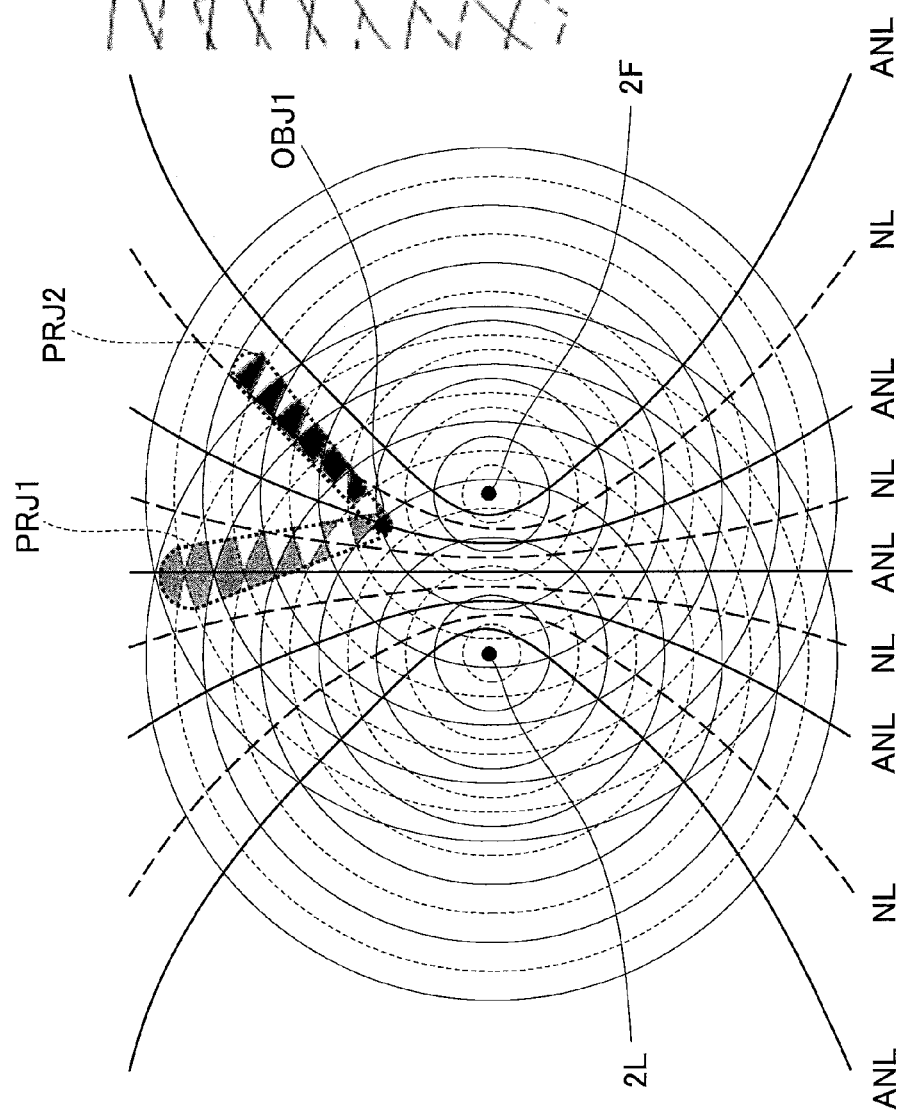
FIGS. 17A and 17B are diagrams for illustrating an effect that prevents an object in an overlap area of the respective imaging ranges of two cameras from disappearing.
Figure 17B:
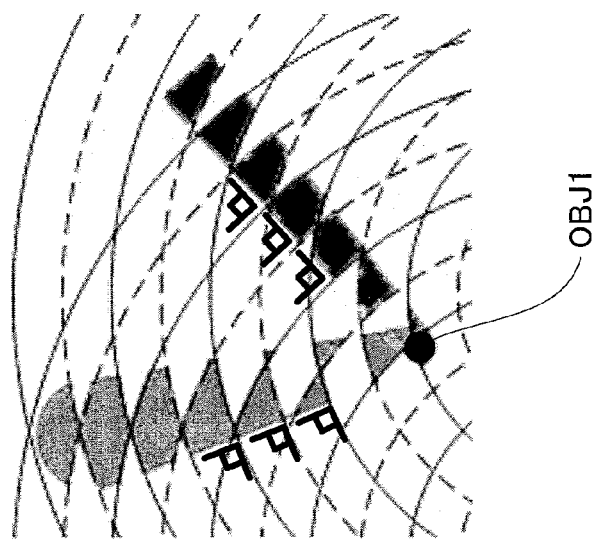

FIGS. 17A and 17B are diagrams for illustrating an effect that prevents an object in the overlap area of the respective imaging ranges of two cameras from disappearing. FIG. 17A illustrates a chart of waves for forming the lattice pattern illustrated in FIG. 13 and FIG. 17B is an enlarged view of part of FIG. 17A.

In FIG. 17A, a projected image PRJ1 surrounded by a dotted line represents the image of an object OBJ1 in the input image of the front camera 2F which image is elongated in a direction of extension of a line that connects the front camera 2F and the object OBJ1 by a viewpoint transformation for generating a road surface image (an image displayed in the case of generating a road surface image in the part output image R12 using the part input image R11 of the front camera 2F).

Furthermore, a projected image PRJ2 surrounded by a dotted line represents the image of the object OBJ1 in the input image of the left-side-part camera 2L which image is elongated in a direction of extension of a line that connects the left-side-part camera 2L and the object OBJ1 by a viewpoint transformation for generating a road surface image (an image displayed in the case of generating a road surface image in the part output image R12 using the part input image R10 of the left-side-part camera 2L).

The projected image PRJ1 and the projected image PRJ2 are not displayed as they are and are displayed in a state where they are partly cut off as illustrated in FIG. 17B in the final output image.

Furthermore, in FIG. 17A, of the broken-line area representing the projected image PRJ1, a part filled with gray represents a part that overlaps with the unit pattern areas LT1 through which an antinodal line ANL passes (see FIG. 13), and indicates that coordinates in the input image plane of the front camera 2F (coordinates within an area that forms the image of the object OBJ1) are correlated with each set of coordinates in the output image corresponding to the overlapping part.

On the other hand, of the broken-line area representing the projected image PRJ1, a part filled with white represents a part that overlaps with the unit pattern areas LT2 through which a nodal line NL passes (see FIG. 13), and indicates that coordinates in the input image plane of the left-side-part camera 2L (coordinates within an area that does not form the image of the object OBJ1) are correlated with each set of coordinates in the output image corresponding to the overlapping part.

Alternatively, coordinates in the input image plane of the left-side-part camera 2L (coordinates within an area that does not form the image of the object OBJ1) may be correlated with each set of coordinates in the output image corresponding to the part filled with gray of the broken-line area representing the projected image PRJ1, and coordinates in the input image plane of the front camera 2F (coordinates within an area that forms the image of the object OBJ1) may be correlated with each set of coordinates in the output image corresponding to the part filled with white of the broken-line area representing the projected image PRJ1.

In this case, the projected image PRJ1 is cut by the unit pattern areas LT2 that include part of circles (circles drawn by the peaks and troughs of waves from the position of the front camera 2F serving as a wave source) perpendicular to the direction of elongation of the projected image PRJ1 as their boundary lines as illustrated in FIG. 17B. The projected image PRJ1, however, is less likely to be divided into thin strips because the vertexes of adjacent unit pattern areas LT1 and LT2 are in contact with each other. Furthermore, because each of the unit pattern areas LT2 includes part of a circle perpendicular to the direction of elongation of the projected image PRJ1, the projected image PRJ1 is stored, being sharply outlined so as to be easily recognizable.

Furthermore, the projected image PRJ1 tends to be more elongated in a direction away from the camera as the object OBJ1 increases in height and to be larger as the distance from the camera increases. The unit pattern areas LT1 and LT2, however, both become larger by the same degree as the projected image PRJ1 as the distance from the camera increases. Therefore, the state of cutting of the projected image PRJ1 is kept substantially uniform.

Furthermore, in FIG. 17A, of the broken-line area representing the projected image PRJ2, a part filled with black represents a part that overlaps with the unit pattern areas LT2 through which a nodal line NL passes (see FIG. 13), and indicates that coordinates in the input image plane of the left-side-part camera 2L (coordinates within an area that forms the image of the object OBJ1) are correlated with each set of coordinates in the output image corresponding to the overlapping part.

On the other hand, of the broken-line area representing the projected image PRJ2, a part filled with white represents a part that overlaps with the unit pattern areas LT1 through which an antinodal line ANL passes (see FIG. 13), and indicates that coordinates in the input image plane of the front camera 2F (coordinates within an area that does not form the image of the object OBJ1) are correlated with each set of coordinates in the output image corresponding to the overlapping part.

Alternatively, coordinates in the input image plane of the front camera 2F (coordinates within an area that does not form the image of the object OBJ1) may be correlated with each set of coordinates in the output image corresponding to the part filled with black of the broken-line area representing the projected image PRJ2, and coordinates in the input image plane of the left-side-part camera 2L (coordinates within an area that forms the image of the object OBJ1) may be correlated with each set of coordinates in the output image corresponding to the part filled with white of the broken-line area representing the projected image PRJ2.

In this case, like the projected image PRJ1, the projected image PRJ2 is cut by the unit pattern areas LT1 that include part of circles (circles drawn by the peaks and troughs of waves from the position of the left-side-part camera 2L serving as a wave source) perpendicular to the direction of elongation of the projected image PRJ2 as their boundary lines as illustrated in FIG. 17B. The projected image PRJ2, however, is less likely to be divided into thin strips because the vertexes of adjacent unit pattern areas LT1 and LT2 are in contact with each other. Furthermore, because each of the unit pattern areas LT1 includes part of a circle perpendicular to the direction of elongation of the projected image PRJ2, the projected image PRJ2 is stored, being sharply outlined so as to be easily recognizable.

Furthermore, like the projected image PRJ1, the projected image PRJ2 tends to be more elongated in a direction away from the camera as the object OBJ1 increases in height and to be larger as the distance from the camera increases. The unit pattern areas LT1 and LT2, however, both become larger by the same degree as the projected image PRJ2 as the distance from the camera increases. Therefore, the state of cutting of the projected image PRJ2 is kept substantially uniform.

FIG. 18 illustrates a difference between the part output image R12 illustrated in FIG. 16 and a part output image R13 in the case where the lattice pattern is applied to the part output image R12 of FIG. 16 in a contrasting manner. The left image of FIG. 18 illustrates the part output image R12 illustrated in FIG. 16, and the right image of FIG. 18 illustrates the part output image R13 to which the lattice pattern is applied.

The part output image R12 of the left image of FIG. 18, which includes the boundary between the area based on the part input image R10 of the left-side-part camera 2L in the output image and the area based on the part input image R11 of the front camera 2F in the output image, shows a state where the person is missing. The part output image R13 of the right image of FIG. 18, however, in which the area based on the part input image R10 of the left-side-part camera 2L in the output image and the area based on the part input image R11 of the front camera 2F in the output image exist in mixture as a lattice pattern, shows the person in an easily recognizable manner without causing the person to disappear. Therefore, it is possible to ensure that the user who views the output image including the part output image R13 recognizes the presence of the person.

Because of the above-described configuration, in generating part of an output image that corresponds to the overlap area of the respective imaging ranges of two cameras, the image generating apparatus 100 can prevent an object in the part of the output image from disappearing using the above-described lattice pattern. Therefore, compared with the case of joining two input images so that respective part areas of the two input images are alternately arranged in the form of comb teeth, the image generating apparatus 100 can display a projected image of an object that is partly cut off in such a manner as to make it easier for the user to recognize the projected image.

According to the above-described embodiment, the image generating apparatus 100 generates an output image using the space model MD that includes the first plane area R1 set at the height of the distance D1 (for example, 1200 mm) from the road surface. This is for preventing, in generating a road surface image from an input image including the hopper part image, the hopper part image from being displayed excessively large to give a feeling of strangeness to the user who views the road surface image. Specifically, in the road surface image generated by a viewpoint transformation, an object at a position higher than the height of the first plane area R1 in the actual three-dimensional space tends to be displayed large, and an object at a position lower than the height of the first plane area R1 in the actual three-dimensional space tends to be displayed small. Therefore, in the road surface image generated by a viewpoint transformation, when the first plane area R1 is level with the road surface, an image of the hopper part 62 at a predetermined height from the road surface (hopper part height) is displayed larger than necessary. On the other hand, when the first plane area R1 is at the same height as the hopper part height, the hopper part image can be displayed without being rendered larger than is required in the road surface image generated by a viewpoint transformation.

When an image of the screed part 63 (hereinafter, "screed part image") at a position lower than the hopper part height is displayed small as a result of using the space model MD, however, the user who views an output image including the hopper part image and the screed part image may have a feeling of strangeness. This is because the width of the screed part image is displayed smaller than the width of the hopper part image in the output image as illustrated in FIG. 10 although the width of the screed part 63 in the extended state is greater than the width of the hopper part 62 in the fully open state (see FIG. 2B).

Therefore, the image generating apparatus 100 prevents the image of the screed part 63 from being displayed excessively small while preventing the hopper part image from being displayed excessively large by altering the configuration of the space model MD. That is, by altering the configuration of the space model MD, the image generating apparatus 100 can generate an output image so that the size relationship between the width of the hopper part image and the width of the screed part image in the output image is consistent with the actual size relationship between the width of the hopper part 62 and the width of the screed part 63.

Figure 19A:
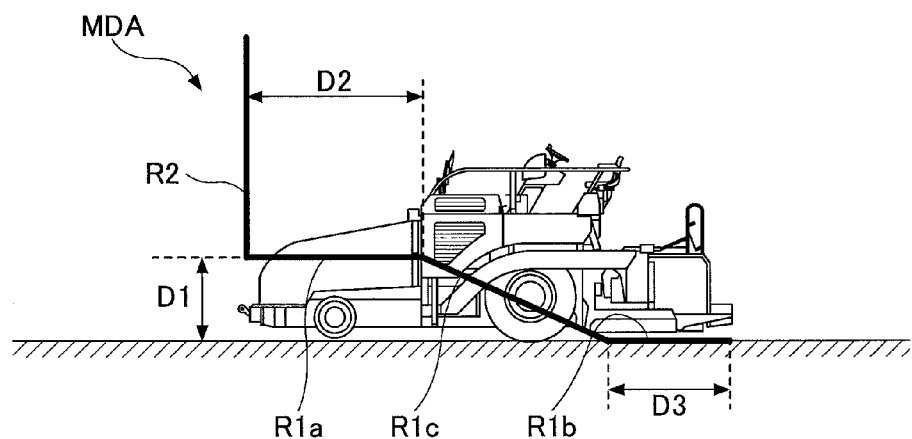
FIGS. 19A, 19B and 19C are diagrams illustrating another space model onto which an input image is projected.
Figure 19B:
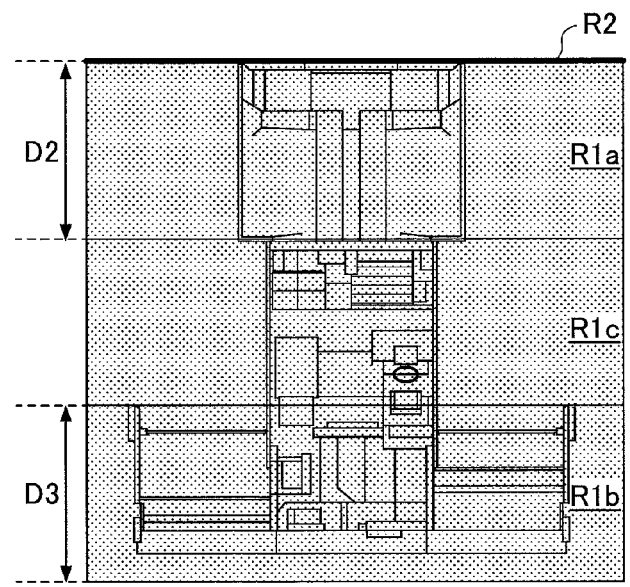
Figure 19C:
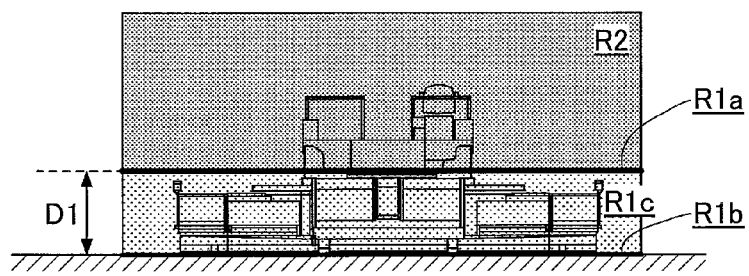

FIGS. 19A, 19B and 19C are diagrams illustrating a space model MDA whose configuration is altered so that the size relationship between the width of the hopper part image and the width of the screed part image is consistent with the actual size relationship, and corresponds to FIGS. 3A through 3C. FIG. 19A illustrates the relationship between the asphalt finisher 60 and the space model MDA when the asphalt finisher 60 is viewed from the left side. FIG. 19B illustrates the relationship between the asphalt finisher 60 and the space model MDA when the asphalt finisher 60 is viewed from above. FIG. 19C illustrates the relationship between the asphalt finisher 60 and the space model MDA when the asphalt finisher 60 is viewed from the rear.

As illustrated in FIGS. 19A through 19C, the space model MDA includes a hopper part plane area R1$a$, a screed part plane area R1$b$, a connecting surface area R1$b$, and the second plane area R2. The second plane area R2 is the same as the second plane area R2 in the space model MD.

The hopper part plane area R1$a$ is a plane area parallel to a road surface and is set at a position that corresponds to the position of the hopper part 62 and is higher than the road surface. According to this embodiment, like the first plane area R1 in the space model MD, the hopper part plane area R1$a$ is set at the height of the distance D1 (for example, 1200 mm) from the road surface.

Furthermore, according to this embodiment, a length D2 of the hopper part plane area R1$a$ is substantially equal to the length of the hopper part 62 in the traveling direction of the asphalt finisher 60. The length D2 of the hopper part plane area R1$a$, however, may be larger than the length of the hopper part 62. In this case, the hopper part plane area R1$a$ may be elongated rearward relative to the traveling direction so as to include part of the tractor part 61.

The screed part plane area R1$b$ is a plane area parallel to the road surface and corresponds to the position of the screed part 63. According to this embodiment, the screed part plane area R1$b$ is set at the same height as the road surface. The screed part plane area R1$b$, however, may be set at a position higher than the road surface if the position is lower than the hopper part plane area R1$a$. Alternatively, the screed part plane area R1$b$ may be set at a position lower than the road surface.

Furthermore, according to this embodiment, a length D3 of the screed part plane area R1$b$ is substantially equal to the length of the screed part 63 in the traveling direction of the asphalt finisher 60. The length D3 of the screed part plane area R1$b$, however, may be larger than the length of the screed part 63. In this case, the screed part plane area R1$b$ may be elongated forward relative to the traveling direction so as to include part of the tractor part 61.

The connecting surface area R1$c$ is a plane area that connects the hopper part plane area R1$a$ and the screed part plane area R1$b$. Furthermore, the distance from the road surface to the connecting surface area R1$c$ varies between the distance from the road surface to the hopper part plane area R1$a$ and the distance from the road surface to the screed part plane area R1$b$. According to this embodiment, the connecting surface area R1$c$ is a plane area that connects the hopper part plane area R1$a$ and the screed part plane area R1$b$. Specifically, the connecting surface area R1c is an inclined plane area that continuously changes its height at a constant rate between the hopper part plane area R1a set at the height of the distance D1 from the road surface and the screed part plane area R1b set at the height of the road surface. The connecting surface area R1c, however, may alternatively be composed of multiple inclined planes having different angles of inclination so as to change its height continuously and in a stepwise manner. As another alternative, the connecting surface area R1c may be composed of multiple planes parallel to the road surface and multiple planes that intersect the road surface so as to change its height discontinuously and in a stepwise manner. As yet another alternative, the connecting surface area R1c may be composed of one or more curved surfaces or may be formed of a combination of one or more curved surfaces and one or more flat surfaces.

Figure 20:
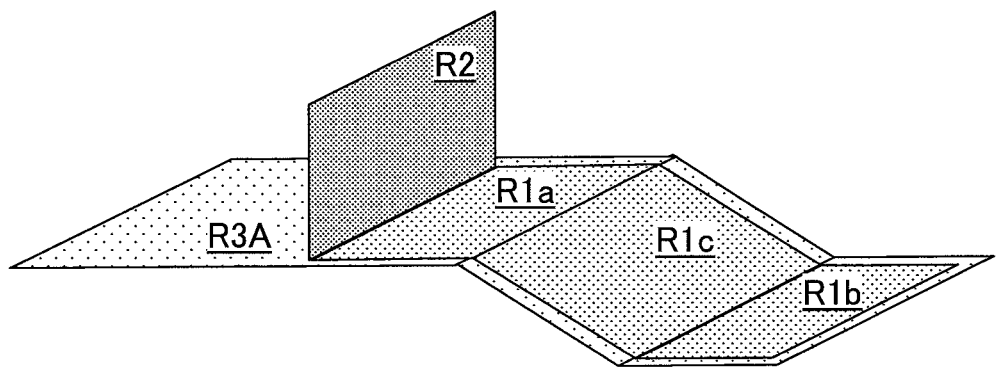
FIG. 20 is a diagram illustrating a relationship between the space model of FIGS. 19A through 19C and the processing object image plane.

FIG. 20 is a diagram illustrating a relationship between the space model MDA and the processing object image plane, and corresponds to FIG. 4. According to this embodiment, a processing object image plane R3A is, for example, a combination of three planes including the hopper part plane area R1a, the screed part plane area R1b, and the connecting surface area R1b of the space model MDA.

Next, a description is given, with reference to FIGS. 21A, 21B and 21C and FIGS. 22A and 22B, of a difference between an output image generated using the space model MD and an output image generated using the space model MDA.

FIGS. 21A through 21C illustrate the state of the asphalt finisher 60 with the hopper part 62 fully open. FIG. 21A is a plan view of the actual asphalt finisher 60. FIG. 21B is an output image generated using the space model MDA. FIG. 21C is an output image generated using the space model MD.

Figure 22A:
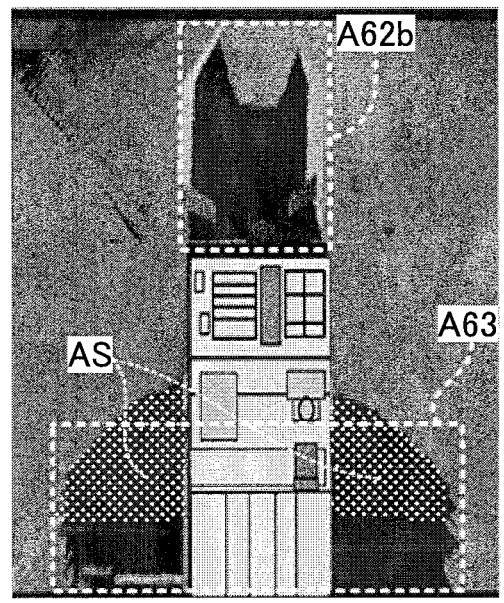
FIGS. 22A and 22B illustrate yet other display examples of the output image.
Figure 22B:
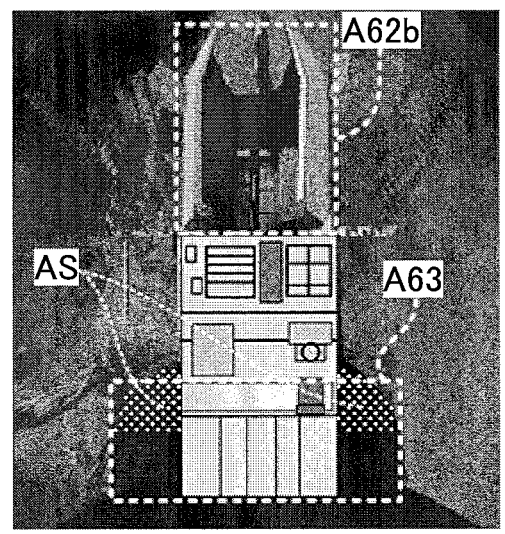

Furthermore, FIGS. 22A and 22B illustrates the state of the asphalt finisher 60 with the hopper part 62 fully closed. FIG. 22A is an output image generated using the space model MDA. FIG. 22B is an output image generated using the space model MD.

A broken-line area A62a of FIGS. 21B and 21C represents the size of the image of the hopper part 62 in the fully open state, and the size is the same in the output image of FIG. 21B and the output image of FIG. 21C. Furthermore, a broken-line area A62b of FIGS. 22A and 22B represents the size of the image of the hopper part 62 in the fully closed state, and the size is the same in the output image of FIG. 22A and the output image of FIG. 22B. The images of the hopper part 62 in FIGS. 21B and 21C and FIGS. 22A and 22B are generated using the first plane area R1 or the hopper part plane area R1a that is set at a position higher than the road surface so as not to be displayed excessively large.

Furthermore, a broken-line area A63 in FIGS. 21B and 21C and FIGS. 22A and 22B represents the size of the image of the screed part 63 in the extended state. Furthermore, the broken-line area A63 has the same size in the output image of FIG. 21B and the output image of FIG. 21C, and has the same size in the output image of FIG. 22A and the output image of FIG. 22B.

Furthermore, an area AS indicated by a dot pattern in FIGS. 22A and 22B represents a spread condition of an asphalt material scattered over a road surface in front of the screed part 63 before the asphalt material is laid.

The broken lines that delimit the broken-line areas A62a, A62b and A63 and the dot pattern that represents the area AS are only for explanatory purposes and are not displayed in the output image.

As illustrated in FIG. 21C, in the output image generated using the space model MD, the width of the image of the screed part 63 in the extended state is displayed smaller than the width of the image of the hopper part 62 in the fully open state, so that a size relationship that is different from the actual size relationship as illustrated in FIG. 21A is displayed. On the other hand, as illustrated in FIG. 21B, in the output image generated using the space model MDA, the width of the image of the screed part 63 in the extended state is displayed larger than the width of the image of the hopper part 62 in the fully open state, so that a size relationship that is consistent with the actual size relationship as illustrated in FIG. 21A is displayed.

Likewise, as illustrated in FIG. 22B, in the output image generated using the space model MD, the width of the image of the screed part 63 in the extended state is displayed only slightly larger than the width of the image of the hopper part 62 in the fully closed state, so that a size relationship different from the actual size relationship (not graphically represented) is displayed. On the other hand, as illustrated in FIG. 22A, in the output image generated using the space model MDA, the width of the image of the screed part 63 in the extended state is displayed conspicuously larger than the width of the image of the hopper part 62 in the fully closed state, so that a size relationship that is consistent with the actual size relationship is displayed.

Thus, by generating an output image using the space model MDA, the image generating apparatus 100 can achieve an additional effect, besides the effects due to the space model MD, that it is possible to cause the size relationship between the width of the hopper part image and the width of the screed part image to be consistent with the actual size relationship. Furthermore, because the spread condition of an asphalt material before the asphalt material is laid is displayed large, the image generating apparatus 100 can achieve an additional effect that it is possible to significantly improve the visibility of the spread condition of an asphalt material before the asphalt material is laid. As a result, in addition to the positional relationship between the asphalt finisher 60 and its surrounding objects, the image generating apparatus 100 can show the user the condition of the asphalt finisher 60 including the opening or closing state of the hopper part 62, the extended state of the screed part 63, etc., and the spread condition of an asphalt material before the asphalt material is laid in a more easily understandable manner, and accordingly can further improve the safety and operability of the asphalt finisher 60. Here, "causing the size relationship between the width of the hopper part image and the width of the screed part image to be consistent with the actual size relationship" includes causing the ratio of the width of the hopper part image and the width of the screed part image to be exactly the same as the ratio of the actual width of the hopper part 62 and the actual width of the screed part 63. Furthermore, the width of the hopper part image is already adjusted so as not to be excessively large by the hopper part plane area R1a set at a position higher than the road surface.

Furthermore, according to the above-described embodiment, the image generating apparatus 100 causes the size relationship between the width of the hopper part image and the width of the screed part image to be consistent with the actual size relationship, using the space model MDA that includes two plane areas different in distance from a road surface (the hopper part plane area R1a and the screed part plane area R1b). The present invention, however, is not limited to this configuration. For example, the image generating apparatus 100 may cause the size relationship between the width of the hopper part image and the width of the screed part image to be consistent with the actual size relationship, using, the space model MD that includes only one plane area parallel to a road surface (the first plane area R1) or using a space model that includes the hopper part plane area R1a and the screed part plane area R1b that are equal in distance from a road surface. In these cases, the image generating apparatus 100 may enlarge the screed part image in the output image by performing image conversion (for example, a scale transformation) on the screed part image projected onto a plane area parallel to a road surface. In the case of generating an output image using the space model MDA, the image generating apparatus 100 may enlarge the screed part image in the output image by performing image conversion (for example, a scale transformation) on the screed part image projected onto the screed part plane area R1b.

A description is given above of a preferred embodiment of the present invention. The present invention, however, is not limited to the above-described embodiment, and variations and replacements may be added to the above-described embodiment without departing from the scope of the present invention.

For example, the image generating apparatus 100 may be mounted on a guss asphalt finisher that uses a guss asphalt mixture.

What is claimed is:

1. An image generating apparatus for a paving machine, the image generating apparatus generating an output image based on input images captured by a plurality of image capturing parts attached to the paving machine, the image generating apparatus comprising:
    a coordinates correlating part configured to correlate coordinates in a space model disposed around the paving machine with coordinates in input image planes in which the input images are positioned; and
    an output image generating part configured to generate the output image by correlating values of the coordinates in the input image planes with values of coordinates in an output image plane in which the output image is positioned, via the coordinates in the space model,
    wherein the space model includes a first plane area parallel to a road surface and a second plane area that intersects the road surface, and
    wherein the second plane area is set at a front end of the paving machine in a traveling direction of the paving machine.

2. The image generating apparatus for a paving machine as claimed in claim 1,
    wherein the coordinates correlating part further correlates coordinates in a processing object image plane in which a processing object image to be subjected to image conversion is positioned with the coordinates in the space model, and
    wherein the output image generating part generates the output image by correlating the values of the coordinates in the input image planes with the values of the coordinates in the output image plane via the coordinates in the processing object image plane and the coordinates in the space model.

3. The image generating apparatus for a paving machine as claimed in claim 1,
    wherein the paving machine includes a hopper part on a front side relative to the traveling direction, and
    wherein the second plane area is set at a front end of the hopper part so as to be perpendicular to the road surface and perpendicular to the traveling direction.

4. The image generating apparatus for a paving machine as claimed in claim 3,
    wherein the first plane area is set at a predetermined height from the road surface.

5. The image generating apparatus for a paving machine as claimed in claim 4,
    wherein the paving machine includes a screed part on a rear side relative to the traveling direction, and
    wherein an imaging range of the plurality of image capturing parts is a continuous area around the paving machine that includes an entirety of the hopper part and a right end and a left end of the screed part.

6. An operation support system that supports a movement or an operation of a paving machine, comprising:
    the image generating apparatus for a paving machine as claimed in claim 1; and
    a display part that is provided around an operation part for moving or operating the paving machine and that displays the output image generated by the image generating apparatus for a paving machine.

7. An image generating apparatus for a paving machine, the image generating apparatus generating an output image based on input images captured by a plurality of image capturing parts attached to the paving machine that includes a hopper part and a screed part, the image generating apparatus comprising:
    a coordinate correlating part configured to correlate coordinates in a space model disposed around the paving machine with coordinates in input image planes in which the input images are positioned; and
    an output image generating part configured to generate the output image by correlating values of the coordinates in the input image planes with values of coordinates in an output image plane in which the output image is positioned, via the coordinates in the space model,
    wherein the space model includes a hopper part plane area parallel to a road surface, the hopper part plane area corresponding to a position of the hopper part and being set at a position higher than the road surface, and
    wherein the output image generating part causes a size relationship between an image of the hopper part and an image of the screed part in the output image to be consistent with an actual size relationship between the hopper part and the screed part.

8. The image generating apparatus for a paving machine as claimed in claim 7,
    wherein the coordinate correlating part further correlates coordinates in a processing object image plane in which a processing object image to be subjected to image conversion is positioned with the coordinates in the space model, and
    wherein the output image generating part generates the output image by correlating the values of the coordinates in the input image planes with the values of the coordinates in the output image plane via the coordinates in the processing object image plane and the coordinates in the space model.

9. The image generating apparatus for a paving machine as claimed in claim 7,
    wherein the space model includes a screed part plane area parallel to the road surface, the screed part plane area corresponding to a position of the screed part, and
    wherein a distance from the road surface to the hopper part plane area is greater than a distance from the road surface to the screed part plane area.

10. The image generating apparatus for a paving machine as claimed in claim 9,
    wherein the space model includes a connecting surface area that connects the hopper part plane area and the screed part plane area, and wherein a distance from the road surface to the connecting surface area varies between the distance from the road surface to the hopper part plane area and the distance from the road surface to the screed part plane area.

11. The image generating apparatus for a paving machine as claimed in claim 7,
wherein the image of the screed part in the output image is displayed in an enlarged manner.

12. The image generating apparatus for a paving machine as claimed in claim 7,
wherein the space model includes another plane area set at a front end of the hopper part so as to be perpendicular to the road surface and perpendicular to a traveling direction of the paving machine.

13. The image generating apparatus for a paving machine as claimed in claim 7,
wherein an imaging range of the plurality of image capturing parts is a continuous area around the paving machine that includes an entirety of the hopper part and a right end and a left end of the screed part.

14. An operation support system that supports a movement or an operation of a paving machine, comprising:
the image generating apparatus for a paving machine as claimed in claim 7; and
a display part that is provided around an operation part for moving or operating the paving machine and that displays the output image generated by the image generating apparatus for a paving machine.

* * * * *